United States Patent
Kasher et al.

(10) Patent No.: US 10,873,871 B2
(45) Date of Patent: Dec. 22, 2020

(54) PATH SELECTION FOR FINE TIMING MEASUREMENT PROTOCOL

(71) Applicant: QUALCOMM Incorporated, San Diego, CA (US)

(72) Inventors: Assaf Yaakov Kasher, Haifa (IL); Alecsander Petru Eitan, Haifa (IL); Amichai Sanderovich, Atlit (IL); Solomon Trainin, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/180,928

(22) Filed: Nov. 5, 2018

(65) Prior Publication Data

US 2019/0141556 A1    May 9, 2019

Related U.S. Application Data

(60) Provisional application No. 62/582,254, filed on Nov. 6, 2017.

(51) Int. Cl.
*H04W 24/10*    (2009.01)
*G01S 5/02*    (2010.01)
(Continued)

(52) U.S. Cl.
CPC .......... *H04W 24/10* (2013.01); *G01S 5/0205* (2013.01); *G01S 13/765* (2013.01);
(Continued)

(58) Field of Classification Search
None
See application file for complete search history.

(56) References Cited

U.S. PATENT DOCUMENTS

2016/0202344 A1    7/2016  Sanderovich et al.
2016/0234703 A1*   8/2016  Aldana ............... G01S 5/12
(Continued)

FOREIGN PATENT DOCUMENTS

EP    3038272 A1    6/2016

OTHER PUBLICATIONS

International Search Report and Written Opinion—PCT/US2018/059439—ISA/EPO—dated Feb. 21, 2019.
(Continued)

*Primary Examiner* — Charles C Jiang
*Assistant Examiner* — Saad Khawar
(74) *Attorney, Agent, or Firm* — Steven R. Thiel

(57) ABSTRACT

A first apparatus may identify a first set of antenna settings and a second set of antenna settings based on beamforming training with a second apparatus, and the first set of antenna settings may correspond to a first path that is different from a second path with the second apparatus corresponding to the second set of antenna settings. The first apparatus may generate a first request frame including an indication to use the first path for at least one first field of a first measurement frame, and may output the first request frame for transmission to the second apparatus. The first apparatus may obtain, from the second apparatus, a first measurement frame via the first set of antenna settings for reception of at least one first field and via the second set of antenna settings for reception of one or more second fields of the first measurement frame.

18 Claims, 12 Drawing Sheets

(51) Int. Cl.
  *G01S 13/76* (2006.01)
  *H04B 7/06* (2006.01)
  *H04L 1/18* (2006.01)
  *H04B 7/08* (2006.01)
  *H04L 5/00* (2006.01)
  *H04W 16/28* (2009.01)

(52) U.S. Cl.
  CPC ......... *H04B 7/0617* (2013.01); *H04B 7/0695* (2013.01); *H04B 7/088* (2013.01); *H04L 1/18* (2013.01); *H04L 5/0055* (2013.01); *H04W 16/28* (2013.01); *H04L 5/0023* (2013.01)

(56) References Cited

U.S. PATENT DOCUMENTS

2017/0127412 A1* 5/2017 Amizur .................. G01S 13/74
2017/0222704 A1   8/2017 Eitan et al.
2018/0301804 A1* 10/2018 Gao ....................... H01Q 3/24

OTHER PUBLICATIONS

Stanton K et al: "Addition of p802 .11-MC Fine Timing Measurement (FTM) to p802 .1AS-Rev: Tradeoffs and Proposals Rev 0.9 ; as-Kbstanton-Caldana-Ftm-Addition-to-1as-Guiding-Principles-and-Proposal-0315-V09", IEEE Draft; As-Kbstanton-Caldana-Ftm-Addition-To-1as-Guiding-Principles-And-Proposal-0315-v09,IEEE-SA, Piscataway, NJ USA, vol. 802, No. v09, Mar. 6, 2015 (Mar. 6, 2015), pp. 1-22, XP068096405, [retrieved on Mar. 6, 2015] the whole document.

Wang C-C., (Mediatek): "Specification Framework for Tgaz", 11-az-tg-sfd, IEEE Draft; 11-17-0462-08-00AZ-11-AZ-TG-SFD, IEEE-SA Mentor, Piscataway, NJ USA, vol. 802.11az, No. 8, Oct. 30, 2017, XP068121966, Retrieved from the Internet:URL:https://mentor.ieee.org/802.11/dcn/17/11-17-0462-08-00az-11-az-tg-sfd.docx [retrieved on Oct. 30, 2017], pp. 1-15.

* cited by examiner

PATH SELECTION FOR FINE TIMING MEASUREMENT PROTOCOL

CROSS-REFERENCE TO RELATED APPLICATION(S)

This application claims the benefit of U.S. Provisional Application Ser. No. 62/582,254, entitled "PATH SELECTION FOR FINE TIMING MEASUREMENT PROTOCOL" and filed on Nov. 6, 2017, which is expressly incorporated by reference herein in its entirety.

BACKGROUND

Field

The present disclosure relates generally to communication systems, and more particularly, to a wireless apparatus configured to determine a position of the wireless apparatus.

Introduction

Communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As communication networks become increasingly populated by wireless nodes, more efficient approaches for determination or estimation of location or position information may be needed. The disclosure below describes approaches for more efficiently determining or estimating a location or position of a wireless apparatus using a fine timing measurement (FTM) protocol. The FTM protocol may provide a protocol for location/position determination/estimation using timing measurement frames that may provide an increased resolution, e.g., in comparison to other approaches that may be based on timing. For example, the FTM protocol may provide timing resolution with an order of magnitude in picoseconds and/or nanoseconds. Such an order of magnitude may be more precise than existing approaches, which may translate to more precise location/position determination/estimation.

In an aspect of the disclosure, an apparatus for wireless communication is provided. The apparatus may include a processing system configured to identify a first set of antenna settings and a second set of antenna settings based on beamforming training with a second apparatus, the first set of antenna settings corresponding to a first path with the second apparatus different from a second path with the second apparatus corresponding to the second set of antenna settings, and generate a first request frame including an indication to use the first path for at least one first field of a first measurement frame. The apparatus may include a first interface configured to output the first request frame for transmission to the second apparatus. The apparatus may include a second interface configured to obtain, from the second apparatus, a first measurement frame via the first set of antenna settings for reception of at least one first field of the first measurement frame and via the second set of antenna settings for reception of one or more second fields of the first measurement frame. In an aspect, the first request frame comprises a trigger field, and the indication to use the first path comprises a value of the trigger field. In an aspect, the processing system is further configured to generate, based on the first measurement frame, a first acknowledgement (ACK) frame including at least one first field and including one or more second fields, and the first interface is further configured to output the first ACK frame for transmission to the second apparatus via the first set of antenna settings for the at least one first field of the first ACK frame and via the second set of antenna settings for the one or more second fields of the first ACK frame. In an aspect, the one or more second fields of the first ACK frame comprise at least one of a short training field (STF), a channel estimation field (CEF), a header field, or a data field. In an aspect, the header field includes one or more bits indicating use of the first path for the at least one first field of the first ACK frame. In an aspect, the second interface is further configured to obtain, from the second apparatus, a second measurement frame via the first set of antenna settings for reception of at least one first field of the second measurement frame and via the second set of antenna settings for reception of one or more second fields of the second measurement frame, the one or more second fields of the second measurement frame including a data field indicating a time of departure $t_1$ associated with the first measurement frame and a time of arrival $t_4$ associated with the first ACK frame, and the processing system is further configured to determine a position of the apparatus based on the time of departure $t_1$ and the time of arrival $t_4$, and at least one of output the position of the apparatus to an application layer of the apparatus or output a message that indicates the position of the apparatus for transmission to a server. In an aspect, the processing system is further configured to store a time of arrival $t_2$ associated with the at least one first field of the first measurement frame, store a time of departure $t_3$ associated with the first ACK frame, and determine the position of the apparatus further based on the time of arrival $t_2$ and the time of departure $t_3$. In an aspect, the one or more second fields of the second measurement frame include a data field that indicates an angle of arrival associated with the first ACK frame, and the processing system is further configured to determine the position of the apparatus further based on the angle of arrival. In an aspect, the at least one first field comprises a training (TRN) field, and wherein the first request frame and the first measurement frame are associated with a fine timing measurement (FTM) session.

In an aspect of the disclosure, an apparatus for wireless communication is provided. The apparatus may include a first interface configured to obtain a first request frame including an indication to use a first path with a second apparatus for communicating at least a first field of a first measurement frame, the first path with the second apparatus different from a second path with the second apparatus. The apparatus may include a processing system configured to identify, based on beamforming training with the second apparatus, a first set of antenna settings corresponding to the first path with the second apparatus and a second set of antenna settings corresponding to the second path with the second apparatus, and generate, based on the first request frame, the first measurement frame including the at least one first field and including one or more second fields. The apparatus may include a second interface configured to output the first measurement frame for transmission to the second apparatus via the first set of antenna settings for the at least one first field of the first measurement frame and via the second set of antenna settings for one or more second fields of the first measurement frame. In an aspect, the first request frame comprises a trigger field, the indication to use the first path comprises a value of the trigger field, and the output of the first measurement frame for transmission to the second apparatus via the first set of antenna settings for the at least one first field of the first measurement frame and via the second set of antenna settings for the one or more second fields of the first measurement frame is based on the value of the trigger field. In an aspect, the one or more second fields of the first measurement frame comprise at least one of a short training field (STF), a channel estimation field (CEF), a header field, or a data field. In an aspect, the header field includes one or more bits indicating use of the first path for the at least one first field of the first measurement frame. In an aspect, the first interface is further configured to obtain, from the second apparatus, a first acknowledgement (ACK) frame via the first set of antenna settings for reception of at least one first field of the first ACK frame and via the second set of antenna settings for reception of one or more second fields of the first ACK frame; the processing system is further configured to store a time of departure $t_1$ associated with the at least one first field of the first measurement frame, store a time of arrival $t_4$ associated with the first ACK frame, and generate a second measurement frame including at least one first field and including one or more second fields, the one or more second fields including a data field that indicates the time of departure $t_1$ and the time of arrival $t_4$; and the second interface is further configured to output the second measurement frame for transmission to the second apparatus via the first set of antenna settings for the at least one first field of the second measurement frame and via the second set of antenna settings for the one or more second fields of the second measurement frame. In an aspect, the processing system is further configured to measure an angle of arrival of the first ACK frame, and wherein the generation of the second measurement frame comprises including the measured angle of arrival in the data field of the second measurement frame. In an aspect, the at least one first field comprises a training (TRN) field, and wherein the first request frame and the first measurement frame are associated with a fine timing measurement (FTM) session.

In an aspect of the disclosure, an apparatus for wireless communication is provided. The apparatus may include means for identifying a first set of antenna settings and a second set of antenna settings based on beamforming training with a second apparatus, the first set of antenna settings corresponding to a first path with the second apparatus different from a second path with the second apparatus corresponding to the second set of antenna settings; means for generating a first request frame including an indication to use the first path for at least one first field of a first measurement frame; means for outputting the first request frame for transmission to the second apparatus; and means for obtaining, from the second apparatus, a first measurement frame via the first set of antenna settings for reception of at least one first field of the first measurement frame and via the second set of antenna settings for reception of one or more second fields of the first measurement frame. In an aspect, the first request frame comprises a trigger field, and the indication to use the first path comprises a value of the trigger field. The apparatus may further include means for generating, based on the first measurement frame, a first acknowledgement (ACK) frame including at least one first field and including one or more second fields; and means for outputting the first ACK frame for transmission to the second apparatus via the first set of antenna settings for the at least one first field of the first ACK frame and via the second set of antenna settings for the one or more second fields of the first ACK frame. In an aspect, the one or more second fields of the first ACK frame comprise at least one of a short training field (STF), a channel estimation field (CEF), a header field, or a data field. In an aspect, the header field includes one or more bits indicating use of the first path for the at least one first field of the first ACK frame. The apparatus may further include means for obtaining, from the second apparatus, a second measurement frame via the first set of antenna settings for reception of at least one first field of the second measurement frame and via the second set of antenna settings for reception of one or more second fields of the second measurement frame, the one or more second fields of the second measurement frame including a data field indicating a time of departure $t_1$ associated with the first measurement frame and a time of arrival $t_4$ associated with the first ACK frame, and means for determining a position of the apparatus based on the time of departure $t_1$ and the time of arrival $t_4$, wherein the determined position is at least one of output to an application layer of the apparatus or included in a message for transmission to a server. The apparatus may further include means for storing a time of arrival $t_2$ associated with the at least one first field of the first measurement frame; and means for storing a time of departure $t_3$ associated with the first ACK frame, wherein the determination of the position of the apparatus is further based on the time of arrival $t_2$ and the time of departure $t_3$. In an aspect, the one or more second fields of the second measurement frame include a data field that indicates an angle of arrival associated with the first ACK frame, and wherein the determination of the position of the apparatus is further based on the angle of arrival. In an aspect, the at least one first field comprises a training (TRN) field, and wherein the first request frame and the first measurement frame are associated with a fine timing measurement (FTM) session.

In an aspect of the disclosure, an apparatus for wireless communication is provided. The apparatus may include means for obtaining a first request frame including an indication to use a first path with a second apparatus for communicating at least a first field of a first measurement frame, the first path with the second apparatus different from a second path with the second apparatus; means for identifying, based on beamforming training with the second apparatus, a first set of antenna settings corresponding to the first path with the second apparatus and a second set of antenna settings corresponding to the second path with the second apparatus; and means for generating, based on the first request frame, the first measurement frame including the at least one first field and including one or more second fields; and means for outputting the first measurement frame for transmission to the second apparatus via the first set of antenna settings for the at least one first field of the first measurement frame and via the second set of antenna settings for one or more second fields of the first measurement frame. In an aspect, the first request frame comprises a trigger field, the indication to use the first path comprises a value of the trigger field, and the output of the first measurement frame for transmission to the second apparatus via the first set of antenna settings for the at least one first field of the first measurement frame and via the second set of antenna settings for the one or more second fields of the first measurement frame is based on the value of the trigger field. In an aspect, the one or more second fields of the first measurement frame comprise at least one of a short training field (STF), a channel estimation field (CEF), a header field, or a data field. In an aspect, the header field includes one or more bits indicating use of the first path for the at least one first field of the first measurement frame. The apparatus may further include means for obtaining, from the second apparatus, a first acknowledgement (ACK) frame via the first set of antenna settings for reception of at least one first field of the first ACK frame and via the second set of antenna settings for reception of one or more second fields of the first ACK frame; means for storing a time of departure $t_1$ associated with the at least one first field of the first measurement frame; means for storing a time of arrival $t_4$ associated with the first ACK frame; and means for generating a second measurement frame including at least one first field and including one or more second fields, the one or more second fields including a data field that indicates the time of departure $t_1$ and the time of arrival $t_4$; and means for outputting the second measurement frame for transmission to the second apparatus via the first set of antenna settings for the at least one first field of the second measurement frame and via the second set of antenna settings for the one or more second fields of the second measurement frame. The apparatus may further include means for measuring an angle of arrival of the first ACK frame, wherein the means for generating the second measurement frame is configured to include the measured angle of arrival in the data field of the second measurement frame. In an aspect, the at least one first field comprises a training (TRN) field, and wherein the first request frame and the first measurement frame are associated with a fine timing measurement (FTM) session.

In an aspect of the disclosure, a method for wireless communication by an apparatus is provided. The method may include identifying a first set of antenna settings and a second set of antenna settings based on beamforming training with a second apparatus, the first set of antenna settings corresponding to a first path with the second apparatus different from a second path with the second apparatus corresponding to the second set of antenna settings; generating a first request frame including an indication to use the first path for at least one first field of a first measurement frame; outputting the first request frame for transmission to the second apparatus; and obtaining, from the second apparatus, a first measurement frame via the first set of antenna settings for reception of at least one first field of the first measurement frame and via the second set of antenna settings for reception of one or more second fields of the first measurement frame. In an aspect, the first request frame comprises a trigger field, and the indication to use the first path comprises a value of the trigger field. The method may further include generating, based on the first measurement frame, a first acknowledgement (ACK) frame including at least one first field and including one or more second fields; and outputting the first ACK frame for transmission to the second apparatus via the first set of antenna settings for the at least one first field of the first ACK frame and via the second set of antenna settings for the one or more second fields of the first ACK frame. In an aspect, the one or more second fields of the first ACK frame comprise at least one of a short training field (STF), a channel estimation field (CEF), a header field, or a data field. In an aspect, the header field includes one or more bits indicating use of the first path for the at least one first field of the first ACK frame. The method may further include obtaining, from the second apparatus, a second measurement frame via the first set of antenna settings for reception of at least one first field of the second measurement frame and via the second set of antenna settings for reception of one or more second fields of the second measurement frame, the one or more second fields of the second measurement frame including a data field indicating a time of departure $t_1$ associated with the first measurement frame and a time of arrival $t_4$ associated with the first ACK frame; and determining a position of the apparatus based on the time of departure $t_1$ and the time of arrival $t_4$, wherein the determined position is at least one of output to an application layer of the apparatus or included in a message for transmission to a server. In an aspect, the method may further include storing a time of arrival $t_2$ associated with the at least one first field of the first measurement frame; and storing a time of departure $t_3$ associated with the first ACK frame, wherein the determining the position of the apparatus is further based on the time of arrival $t_2$ and the time of departure $t_3$. In an aspect, the one or more second fields of the second measurement frame include a data field that indicates an angle of arrival associated with the first ACK frame, and the determining the position of the apparatus is further based on the angle of arrival. In an aspect, the at least one first field comprises a training (TRN) field, and wherein the first request frame and the first measurement frame are associated with a fine timing measurement (FTM) session.

In an aspect of the disclosure, a method for wireless communication by an apparatus is provided. The method may include obtaining a first request frame including an indication to use a first path with a second apparatus for communicating at least a first field of a first measurement frame, the first path with the second apparatus different from a second path with the second apparatus; identifying, based on beamforming training with the second apparatus, a first set of antenna settings corresponding to the first path with the second apparatus and a second set of antenna settings corresponding to the second path with the second apparatus; generating, based on the first request frame, the first measurement frame including the at least one first field and including one or more second fields; and outputting the first measurement frame for transmission to the second apparatus via the first set of antenna settings for the at least one first field of the first measurement frame and via the second set of antenna settings for one or more second fields of the first measurement frame. In an aspect, the first request frame comprises a trigger field, the indication to use the first path comprises a value of the trigger field, and the outputting of the first measurement frame for transmission to the second apparatus via the first set of antenna settings for the at least one first field of the first measurement frame and via the second set of antenna settings for the one or more second fields of the first measurement frame is based on the value of the trigger field. In an aspect, the one or more second fields of the first measurement frame comprise at least one of a short training field (STF), a channel estimation field (CEF), a header field, or a data field. In an aspect, the header field includes one or more bits indicating use of the first path for the at least one first field of the first measurement frame. The method may further include obtaining, from the second apparatus, a first acknowledgement (ACK) frame via the first set of antenna settings for reception of at least one first field of the first ACK frame and via the second set of antenna settings for reception of one or more second fields of the first ACK frame; storing a time of departure $t_1$ associated with the at least one first field of the first measurement frame; storing a time of arrival $t_4$ associated with the first ACK frame; generating a second measurement frame including at least one first field and including one or more second fields, the one or more second fields including a data field that indicates the time of departure $t_1$ and the time of arrival $t_4$; and outputting the second measurement frame for transmission to the second apparatus via the first set of antenna settings for the at least one first field of the second measurement frame and via the second set of antenna settings for the one or more second fields of the second measurement frame. The method may further include measuring an angle of arrival of the first ACK frame, wherein the generating the second measurement frame comprises including the measured angle of arrival in the data field of the second measurement frame. In an aspect, the at least one first field comprises a training (TRN) field, and wherein the first request frame and the first measurement frame are associated with a fine timing measurement (FTM) session.

In an aspect of the disclosure, a computer-readable medium storing computer-executable code for wireless communication executable by an apparatus is provided. The computer-readable medium may include code to identify a first set of antenna settings and a second set of antenna settings based on beamforming training with a second apparatus, the first set of antenna settings corresponding to a first path with the second apparatus different from a second path with the second apparatus corresponding to the second set of antenna settings; generate a first request frame including an indication to use the first path for at least one first field of a first measurement frame; output the first request frame for transmission to the second apparatus; and obtain, from the second apparatus, a first measurement frame via the first set of antenna settings for reception of at least one first field of the first measurement frame and via the second set of antenna settings for reception of one or more second fields of the first measurement frame.

In an aspect of the disclosure, a computer-readable medium storing computer-executable code for wireless communication executable by an apparatus is provided. The computer-readable medium may include code to obtain a first request frame including an indication to use a first path with a second apparatus for communicating at least a first field of a first measurement frame, the first path with the second apparatus different from a second path with the second apparatus; identify, based on beamforming training with the second apparatus, a first set of antenna settings corresponding to the first path with the second apparatus and a second set of antenna settings corresponding to the second path with the second apparatus; generate, based on the first request frame, the first measurement frame including the at least one first field and including one or more second fields; and output the first measurement frame for transmission to the second apparatus via the first set of antenna settings for the at least one first field of the first measurement frame and via the second set of antenna settings for one or more second fields of the first measurement frame.

In an aspect of the disclosure, a wireless node for wireless communication is provided. The wireless node may include a processing system configured to: identify a first set of antenna settings and a second set of antenna settings based on beamforming training with a second apparatus, the first set of antenna settings corresponding to a first path with the second apparatus different from a second path with the second apparatus corresponding to the second set of antenna settings, and generate a first request frame including an indication to use the first path for at least one first field of a first measurement frame; a transmitter configured to transmit the first request frame to the second apparatus; and a receiver configured to receive, from the second apparatus, the first measurement frame via the first set of antenna settings for the at least one first field of the first measurement frame and via the second set of antenna settings for one or more second fields of the first measurement frame.

In an aspect of the disclosure, a wireless node for wireless communication is provided. The wireless node may include a receiver configured to receive a first request frame including an indication to use a first path with a second apparatus for communicating at least a first field of a first measurement frame, the first path with the second apparatus different from a second path with the second apparatus; a processing system configured to: identify, based on beamforming training with the second apparatus, a first set of antenna settings corresponding to the first path with the second apparatus and a second set of antenna settings corresponding to the second path with the second apparatus, and generate, based on the first request frame, the first measurement frame including the at least one first field and including one or more second fields; and a transmitter configured to transmit the first measurement frame via the first set of antenna settings for the at least one first field of the first measurement frame and via the second set of antenna settings for one or more second fields of the first measurement frame.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
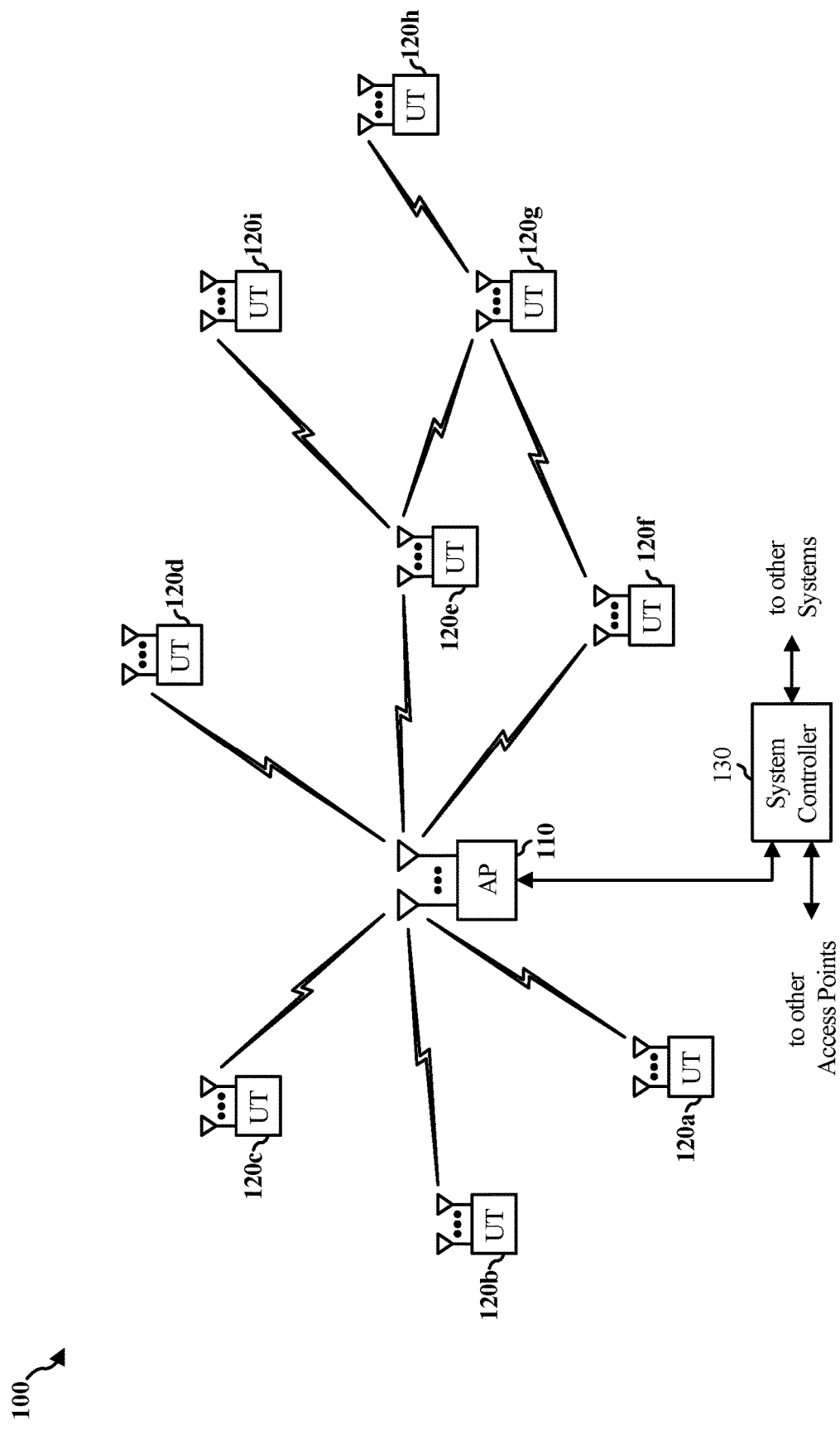
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced. For example, one or more user terminals 120 may signal capabilities (e.g., to access point 110) using the techniques provided herein.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless node, a wireless node, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
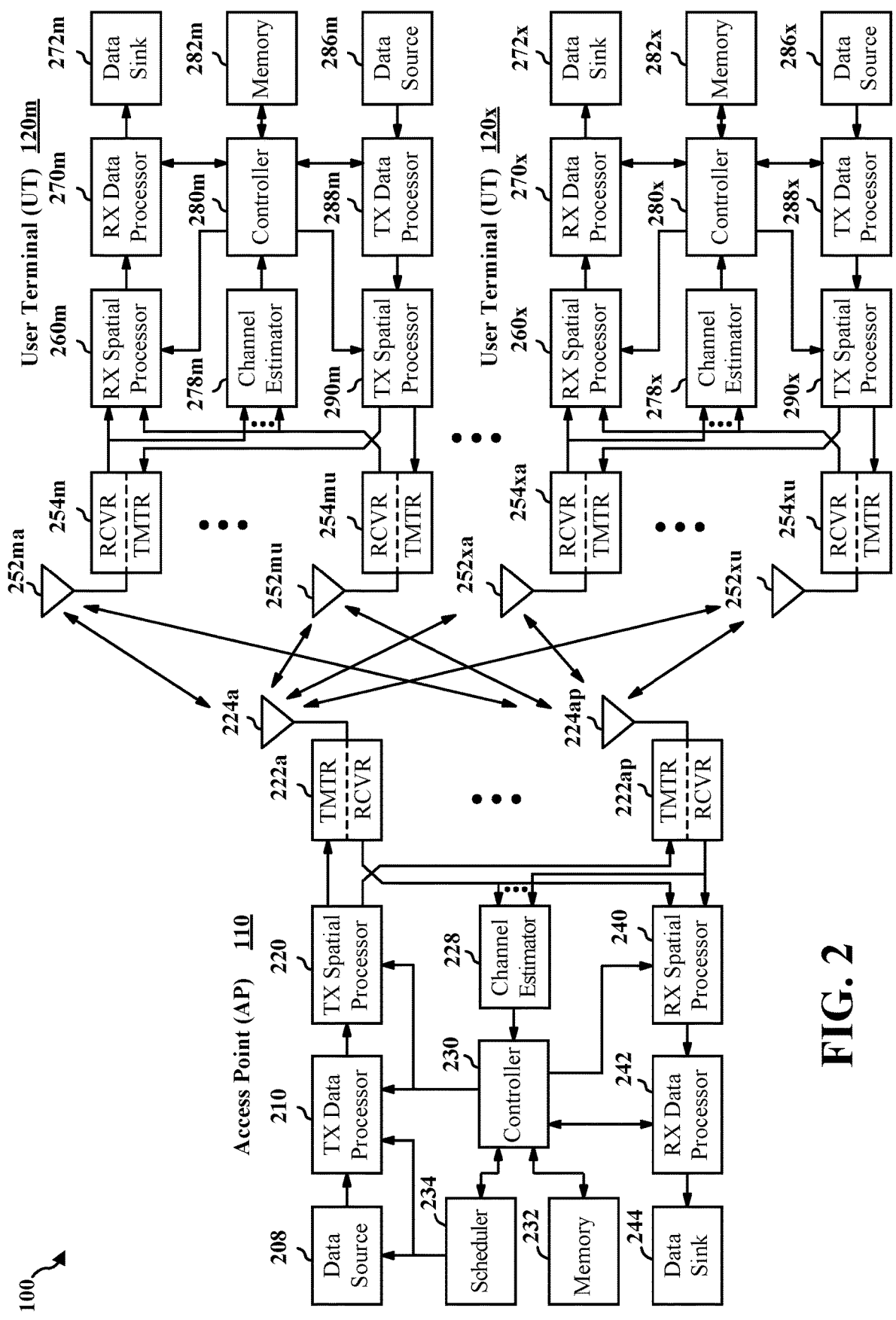
FIG. 2 illustrates a block diagram of an example access point (AP) and user terminals (UTs), in accordance with certain aspects of the present disclosure.

FIG. 2 illustrates a block diagram of access point 110 and two user terminals 120m and 120x in MIMO system 100 that may be examples of the access point 110 and user terminals 120 described above with reference to FIG. 1 and capable of performing the techniques described herein. The various processors shown in FIG. 2 may be configured to perform (or direct a device to perform) various methods described herein.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $Nu_{up}$ user terminals simultaneously transmit on the uplink, while $N_{dn}$ user terminals are simultaneously transmitted to on the downlink by the access point 110. $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$Nu_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, signal-to-noise ratio (SNR) estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain standards, such as the IEEE 802.11ay standard currently in the development phase, extend wireless communications according to existing standards (e.g., the 802.11ad standard) into the 60 gigahertz (GHz) band. Example features to be included in such standards include channel aggregation and Channel-Bonding (CB). In general, channel aggregation utilizes multiple channels that are kept separate, while channel bonding treats the bandwidth of multiple channels as a single (wideband) channel.

Operations in the 60 GHz band may allow the use of smaller antennas as compared to lower frequencies. While radio waves around the 60 GHz band have relatively high atmospheric attenuation, the higher free space loss can be compensated for by using many small antennas, for example, arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
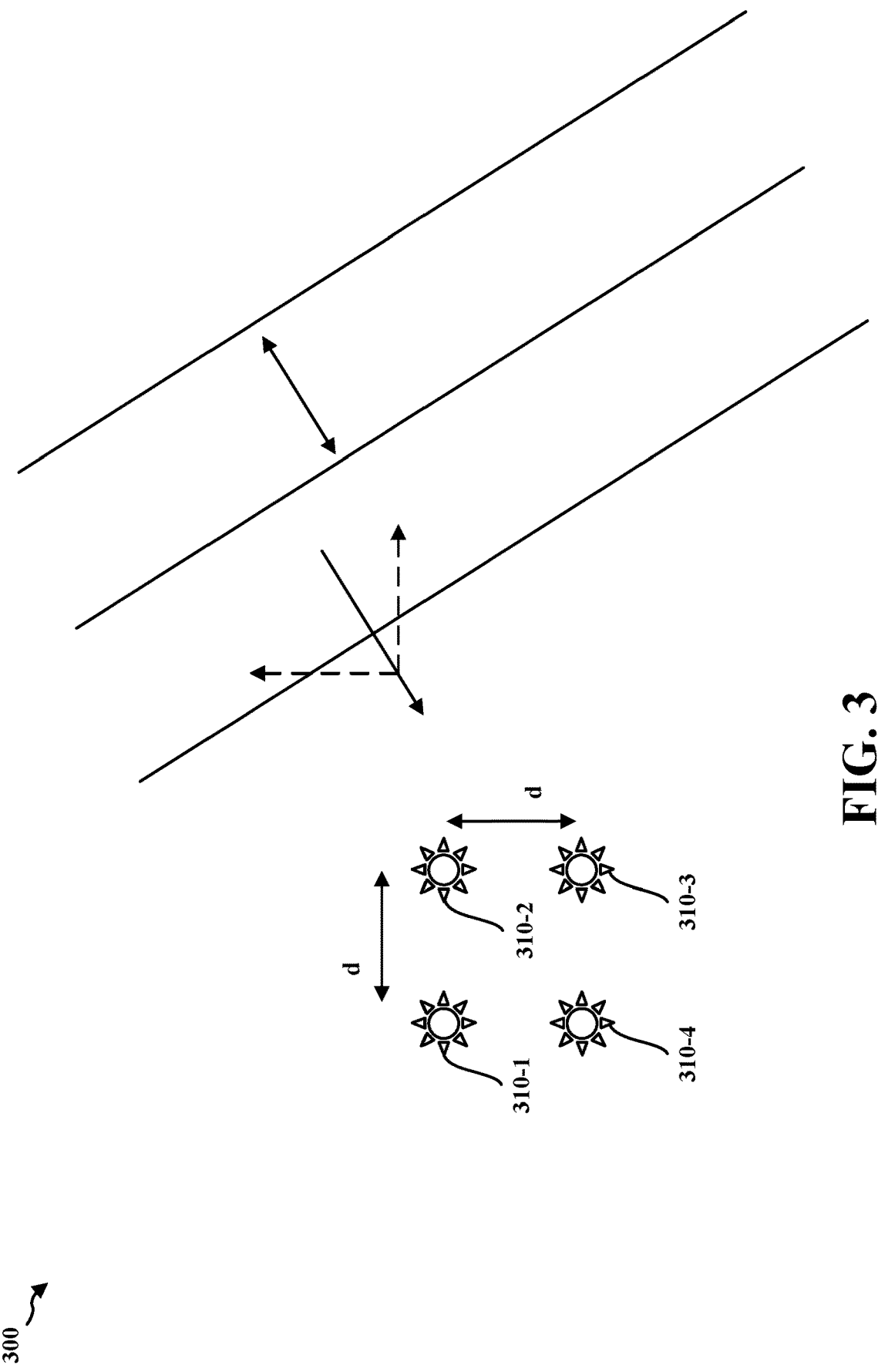
FIG. 3 illustrates a diagram of signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

Example Fine Timing Measurement (FTM) Session

Aspects of the present disclosure may provide for positioning determination based on timing measurement. The aspects described herein may use an FTM protocol with a timing resolution that is more precise than existing approaches. Various approaches described herein may allow a wireless apparatus (e.g., an STA) to determine the position of the wireless apparatus by utilizing communication according to an FTM protocol. The FTM protocol may include an exchange of a plurality of frames that are respectively timestamped. As used herein, "position" may refer to "location" and/or "orientation," either relative to some point of reference or absolute (e.g., earth or geographic coordinates), and may include angles of elevation and azimuth.

According to various standards and specifications, such as IEEE 802.11, wireless apparatuses may be configured to determine (e.g., estimate) a position (e.g., location) of the wireless apparatus. Examples of approaches to determination of a position of a wireless apparatus may be based on round trip time (RTT), angle of arrival (AoA), and/or angle of departure (AoD). According to various aspects, one responder (e.g., AP or another STA) may be sufficient for position determination if both RTT, angular information (e.g., AoA and/or AoD), and/or the location of the responder is available based on communication with the one responder. In other aspects, position determination may be based on input from two responders (e.g., for two dimensions) and/or three responders (e.g., for three dimensions).

According to the FTM protocol, an exchange of a plurality of frames between a wireless apparatus (e.g., initiator) and a remote apparatus (e.g., responder) may enable position determination based on respective timestamps of the exchanged frames. In some aspects, angular information (e.g., AoA and/or AoD information) may be additionally leveraged for position determination.

Figure 4:
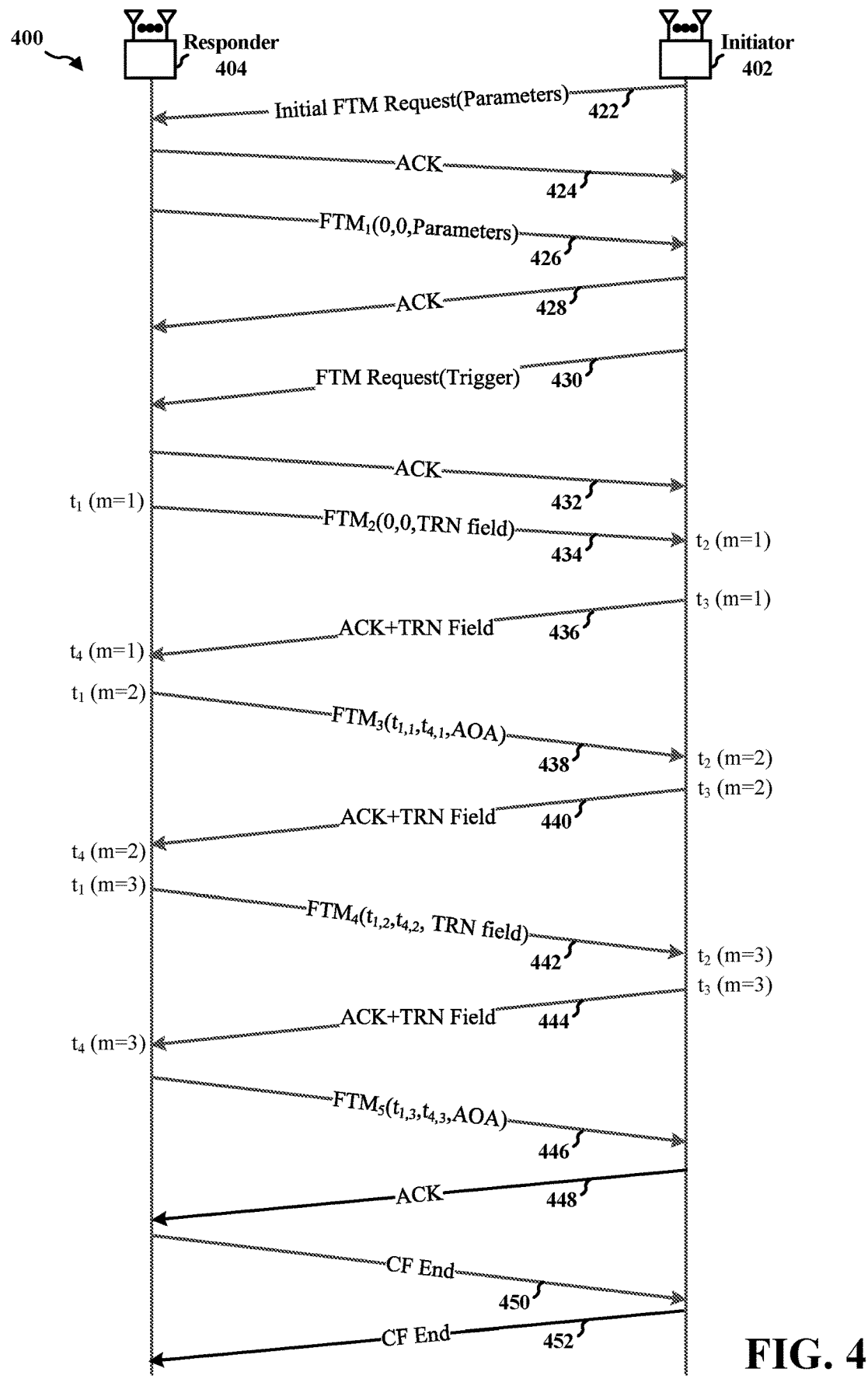
FIG. 4 illustrates a call flow diagram of a fine timing measurement (FTM) protocol, in accordance with certain aspects of the present disclosure.

FIG. 4 is a call flow diagram illustrating a frame exchange according to the FTM protocol. As illustrated, an initiator 402 and a responder 404 may perform the frame exchange according to the FTM protocol. At least a portion of the illustrated frame exchange according to the FTM protocol may be herein referred to as an "FTM session."

In aspects, the initiator 402 may be a wireless apparatus, such as UT 120, an STA, or another wireless communications apparatus. The responder 404 may be another wireless apparatus that is remote from the initiator 402. For example, the responder 404 may be a UT 120, an AP 110, another STA, or another wireless communications apparatus configured to perform the operations described herein.

According to aspects, the initiator 402 may begin an FTM session by transmitting, to the responder 404, an initial FTM request frame 422. The initial FTM request frame 422 may include information indicating a duration of the FTM session, the amount and/or type of FTM data that may be exchanged, and/or other parameters. Examples of the parameters that may be included in the initial FTM request frame 422 may include a number of FTM measurement frames that are to be exchanged, a duration of an FTM measurement frame, the number of FTM measurement frames per burst, the number of bursts per FTM session, and/or other parameters relating to the FTM session.

In aspects, the responder 404 may indicate that the responder 404 intends to participate in the FTM session and accepts the parameters indicated in the initial FTM request frame 422. For example, the responder 404 may transmit an acknowledgement (ACK) message 424 to the initiator 402. In some aspects, the responder 404 may transmit, to the initiator 402, a first FTM measurement frame 426. The responder 404 may indicate, in the first FTM measurement frame 426, whether the request to initiate the FTM session (as indicated by the initial FTM request frame 422) succeeded or failed, whether one or more parameters indicated by the initial FTM request frame 422 are accepted, and the like. In some aspects, the responder 404 may optionally designate and/or renegotiate one or more parameters associated with the FTM session and may indicate the same to the initiator 402 in the first FTM measurement frame 426. In some aspects, the ACK message 424 and the first FTM measurement frame 426 may be included in a same frame. In some aspects, the responder 404 may indicate a time of arrival (ToA) of the initial FTM request frame 422 and/or a time of departure (ToD) of the first FTM measurement frame 426. For example, the responder 404 may indicate a zero (0) for both the ToA and ToD in the first FTM measurement frame 426 (e.g., because the timing measurement portion of the FTM session has not yet been triggered).

In response to the first FTM measurement frame 426, the initiator 402 may transmit an ACK message 428. The initiator 402 may indicate, in the ACK message 428, that the initiator 402 has accepted one or more parameters indicated by the first FTM measurement frame 426. The ACK message 428 may conclude a negotiation portion of the FTM session.

In some aspects, one or more of the frames 422, 426 and/or messages 424, 428 may include timing synchronization information. The inclusion of timing synchronization information may allow the initiator 402 and/or the responder 404 to synchronize timing so that ToA and ToD information is consistent. For example, the timing synchronization information may allow the initiator 402 and/or responder to synchronize a respective clock and/or cycle. In other aspects, timing synchronization information may be included in another frame (e.g., the FTM request frame 430, the second FTM measurement frame 434, or another frame).

In order to begin the measurement portion of the FTM session, the initiator 402 may transmit an FTM request frame 430. The FTM request frame 430 may "trigger" a measurement portion of the FTM session. In aspects, the FTM request frame 430 may include a trigger field. In some aspects, the initiator 402 may set a value of the trigger field.

Conventionally, the FTM session may be performed using a set of antenna settings (e.g., one or more antenna weight vectors) that may correspond to a path between the initiator 402 and the responder 404 having a best channel quality (e.g., a higher SNR relative to one or more other paths, a lower attenuation relative to one or more other paths, etc.). When using the set of antenna settings corresponding to the "best" path, the initiator 402 may set the value of the trigger field to "0" or "1." However, the initiator 402 may be configured to set the value of the trigger field to another value, such as a "2."

As described in the present disclosure, the initiator 402 may set the value of the trigger field to a predefined value in order to indicate to the responder 404 that at least the measurement portion of the FTM session is to occur on a first path instead of the "best" path. For example, the first path may be relatively more direct (e.g., relatively shorter distance, relatively fewer reflections, etc.) than the best path, even though the best path may correspond to a relatively better channel quality than the first path. As described in the present disclosure, the measurement portion of the FTM session may be relatively more accurate using the first path instead of the best path, for example, because the first path may be more direct than the best path (e.g., the first path may be an LoS path). In various aspects, a first portion of a frame may be sent over the best path, whereas a second portion of the frame may be sent over the first path.

Upon receiving the FTM request frame 430, the responder 404 may respond with an ACK message 432. The responder 404 may transmit, to the initiator 402, a second FTM measurement frame 434. The responder 404 may record the ToD time $t_{1,1}$ corresponding to the second FTM measurement frame 434 (e.g., time $t_{1,1}$ may correspond to the end of the second FTM measurement frame 434). The responder 404 may indicate, in the second FTM measurement frame 434, a ToA and/or a ToD. In one aspect, the ToA and/or the ToD may be set to zero (0). In aspects, the second FTM measurement frame 434 may include at least one training (TRN) field, which may be appended to the end of the second FTM measurement frame 434. A TRN field may be associated with beamforming for the initiator 402 and the responder 404. In aspects, the at least one TRN field may comprise a TRN unit and/or TRN subfield(s) carrying a set of Golay sequences.

Based on reception of the second FTM measurement frame 434, the initiator 402 may record the ToA time $t_{2,1}$ at which the second FTM measurement frame 434 is received at the initiator 402. For example, the ToA time $t_{2,1}$ may correspond to the at least one TRN field appended at the end of the second FTM measurement frame 434.

Responsive to reception of the second FTM measurement frame 434, the initiator 402 may transmit a first ACK frame 436. In aspects, the initiator 402 may append at least one TRN field to the first ACK frame 436. Based on transmission of the first ACK frame 436, the initiator 402 may record the ToD time $t_{3,1}$ at which the initiator 402 transmits the first ACK frame 436 (e.g., the ToD time $t_{3,1}$ may correspond to a beginning of the first ACK frame 436).

Based on reception of the first ACK frame 436, the responder 404 may record the ToA time $t_{4,1}$ at which the first ACK frame 436 is received at the responder 404 (e.g., time $t_{4,1}$ may correspond to the begging of the first ACK frame 436 using the channel estimate field following the short training field). The responder 404 may then transmit, to the initiator 402, a third FTM measurement frame 438. The third FTM measurement frame 438 may indicate the ToD time $t_{1,1}$ recorded for the second FTM measurement frame 434 and the ToA time $t_{4,1}$ recorded for the first ACK frame 436. In association with the next FTM measurement burst, the responder 404 may record the ToD time $t_{1,2}$ corresponding to the ToD of the third FTM measurement frame 438.

In some aspects, the responder 404 may include angular information in the third FTM measurement frame 438. For example, the responder 404 may measure an AoA of the first ACK frame 436, and the responder 404 may include information indicating the measured AoA in the third FTM measurement frame 438.

The initiator 402 may receive the third FTM measurement frame 438 and respond with a second ACK frame 440 that may include at least one TRN field. The initiator 402 may calculate an RTT corresponding to the exchange of frames 434, 436. For example, the initiator may calculate a first RTT as $(t_{4,1}-t_{1,1})-(t_{3,1}-t_{2,1})$. The first RTT may have a timing resolution of picoseconds and/or nanoseconds, although other timing resolutions are possible. Using the estimated first RTT, the initiator 402 may be estimate a position of the initiator 402. For example, given the position of the responder 404, the initiator 402 may estimate a position of the initiator 402.

In various aspects, initiator 402 may obtain information indicating the position of the responder 404 based on information included in one of the frames 426, 434, 438 (e.g., in a data field) or information obtained in another frame (e.g., a frame received by the initiator during beamforming training or before the FTM session). In one aspect, the initiator 402 may estimate a position of the initiator 402 further based on angular information associated with one or more frames, such as the AoA included in the third FTM measurement frame 438.

In some aspects, the initiator 402 may provide the times $t_{1,1}$, $t_{2,1}$, $t_{3,1}$, $t_{4,1}$, and/or the angular information to a server (e.g., a location server). The location server may calculate the first RTT for the initiator 402 and provide the first RTT to the initiator, for example, in order to reduce processing load on the initiator 402.

In various aspects, the initiator 402 and responder 404 may continue the FTM session, e.g., until the initiator 402 terminates the FTM session or until a time or number of FTM bursts specified in the negotiated parameters is satisfied. For example, the responder 404 may record the ToA time $t_{4,2}$ corresponding to reception of the second ACK frame 440. The responder 404 may transmit the fourth FTM measurement frame 442 indicating ToD time $t_{1,2}$ of the third FTM measurement frame 438 and the ToA time $t_{4,2}$ of the second ACK frame 440. Using the ToD time $t_{1,2}$ of the third FTM measurement frame 438, the ToA time $t_{4,2}$ of the second ACK frame 440, the ToA time $t_{2,2}$ of the third FTM measurement frame 438, and the ToD time $t_{3,2}$ of the second ACK frame 440, the initiator 402 may calculate a second RTT.

The initiator 402 may record the ToA time $t_{2,3}$ of the fourth FTM measurement frame 442 and respond to the fourth FTM measurement frame 442 with a third ACK frame 444 (including at least one TRN field). The initiator 402 may record the ToD time $t_{3,3}$ of the third ACK frame 444. The responder 404 may transmit, to the initiator 402, a fifth FTM measurement frame 446 that includes the ToD time $t_{1,3}$ of the fourth FTM measurement frame 442 and the ToA time $t_{4,3}$ of third ACK frame 444. In some aspects, the responder 404 may include, in the fifth FTM measurement frame 446, angular information, such as the AoA of the third ACK frame 444.

The initiator 402 may calculate a third RTT based on the ToD time $t_{1,3}$ of the fourth FTM measurement frame 442, the ToA time $t_{4,3}$ of the third ACK frame 444, the ToA time $t_{2,3}$ of the fourth FTM measurement frame 442, and the ToD time $t_{3,3}$ of the third ACK frame 444.

Responsive to the fifth FTM measurement frame 446, the initiator 402 may transmit an ACK message 448, which may conclude the FTM session. In one aspect, the initiator 402 may transmit another FTM request frame with a trigger field set to "0" in order to conclude the FTM session. If the initiator 402 performs a subsequent FTM session, the initiator 402 may again perform one or more of the aforementioned operations, for example, beginning with an initial FTM request in order to negotiate parameters for the subsequent FTM session.

In some aspects, the responder 404 may indicate, to the initiator 402, that a contention free period has concluded. For example, the responder 404 may determine that the wireless medium (e.g., including a channel used for communication between the responder 404 and the initiator 402) is no longer free of contention (e.g., when other apparatuses are to begin communication on the wireless medium). Therefore, the responder 404 may indicate, to the initiator 402, that communication over the wireless medium is to conclude, which may conclude an FTM session. The responder 404 may generate a responder CF end frame 450, e.g., to indicate that the wireless medium is no longer free of contention. The responder 404 may output the responder CF end frame 450 for transmission to the initiator 402.

The initiator 402 may obtain the responder CF end frame 450. The initiator 402 may determine that communication over the wireless medium is to conclude based on the responder CF end frame 450. For example, the initiator 402 may end the FTM session. Responsive to the responder CF end frame 450. The initiator 402 may generate an initiator CF end frame 452. The initiator CF end frame 452 may indicate an acknowledgement that the responder CF end frame 450 is received and communication on the wireless medium is concluded. The initiator 402 may output the initiator CF end frame 452 for transmission to the responder 404. Accordingly, the responder 404 may obtain the initiator CF end frame 452 and communication on the wireless medium may conclude, e.g., until a next session, when the medium is sensed to be free, etc.

Example Positioning Estimation based on FTM Protocol

As described, supra, the FTM protocol may provide an approach to position determination that may be relatively more accurate than existing approaches. However, the position determination by the wireless apparatus may be affected by the path used for the frame exchange according to the FTM protocol. Consequently, the position determination may be adversely affected when the frame exchange occurs on a reflected path, for example, instead of a line of sight (LoS) path between the wireless apparatus and the remote apparatus. In order to address this issue, the present disclosure may describe an approach in which the wireless apparatus uses, for at least a portion of an FTM session (e.g., the measurement portion), a first path (e.g., LoS path) that is relatively more direct than a second path even though the second path may offer relatively better channel conditions than the first path. For example, a first portion of a frame may be sent over the best path, whereas a second portion of the frame may be sent over the first path.

Figure 5:
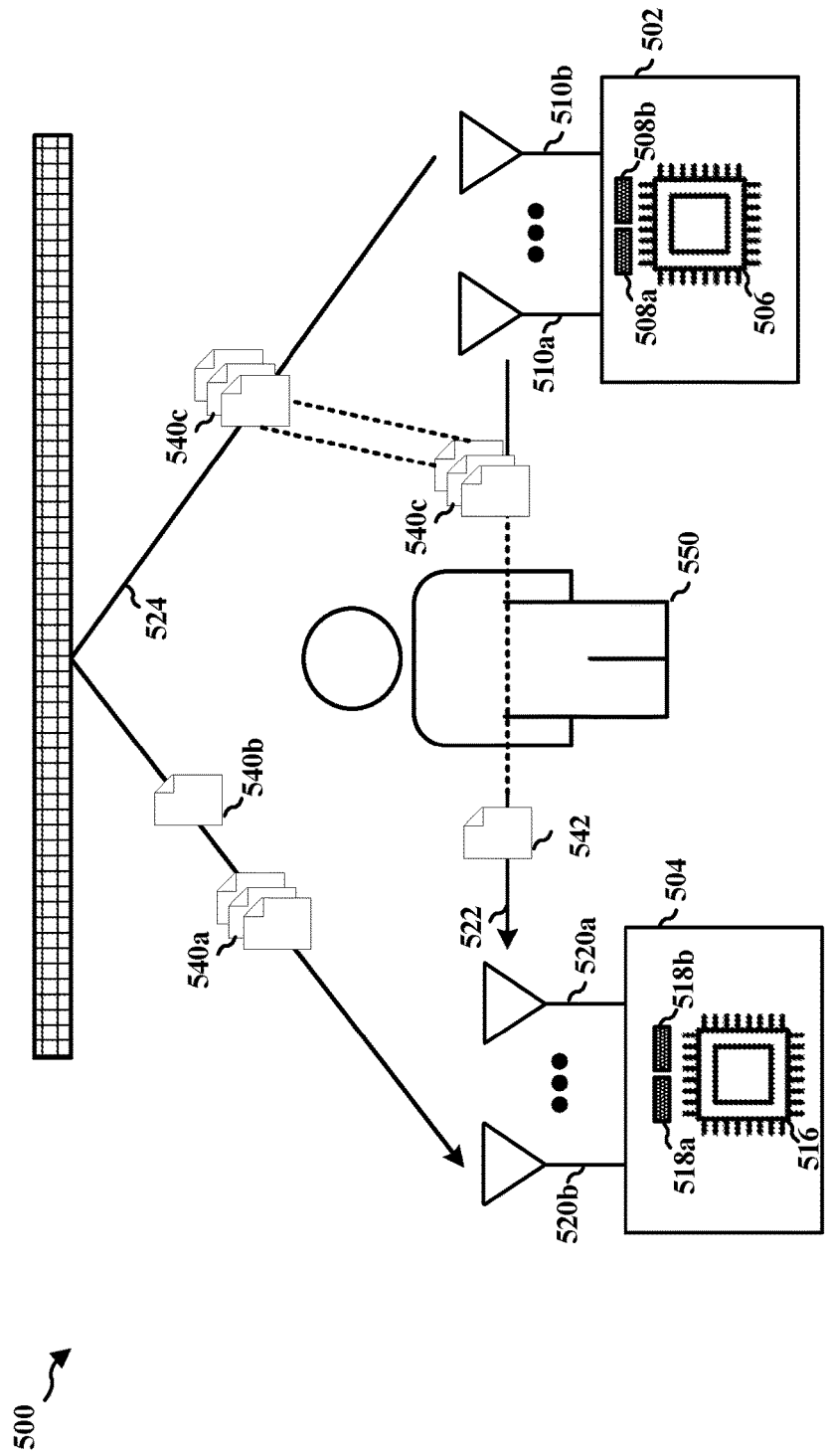
FIG. 5 illustrates a diagram of wireless communications system, in accordance with certain aspects of the disclosure.

FIG. 5 shows an example block diagram of a wireless communications system 500. The wireless communications system 500 may include an initiator 502 (e.g., an aspect of a UT 120, an aspect of the initiator 402, etc.) and a responder 504 (e.g., an aspect of a UT 120, an aspect of an AP 110, an aspect of the responder 404, etc.). The initiator 502 may include a processing system 506 configured to communicate with antenna element(s) of the initiator 502 through a first interface 508a and/or a second interface 508b. Each of the first interface 508a and/or the second interface 508b may be implemented in hardware, software, or a combination. For example, at least one of the first interface 508a and/or the second interface 508b may include a bus (e.g., a bus system connected with the processing system 506) and/or an interface to the processing system 506. In an aspect, the first interface 508a and the second interface 508b may be a same interface. In an aspect, the initiator 502 may control the antenna element(s) of the initiator 502 via different initiator sets of antenna settings 510a-b (e.g., antenna weight vectors). Initiator sets of antenna settings 510a-b may differently control inputs (e.g., for transmission) and/or outputs (e.g., for reception) of antenna element(s) and/or transmit/receive chains corresponding to antenna element(s). For example, initiator sets of antenna settings 510a-b may differently weight input signals to and/or output signals from antenna element(s) (and/or transmit/receive chains) when the initiator 502 applies input signals to be transmitted and/or combines output signals that are received.

The responder 504 may include a processing system 516 configured to communicate with antenna element(s) of the responder 504 through a first interface 518a and/or a second interface 518b. Each of the first interface 518a and/or the second interface 518b may be implemented in hardware, software, or a combination. For example, at least one of the first interface 518a and/or the second interface 518b may include a bus (e.g., a bus system connected with the processing system 516) and/or an interface to the processing system 516. In an aspect, the first interface 518a and the second interface 518b may be a same interface. In an aspect, the responder 504 may control the antenna element(s) of the responder 504 via different responder sets of antennas setting 520a-b (e.g., antenna weight vectors). Responder sets of antenna settings 520a-b may differently control inputs (e.g., for transmission) and/or outputs (e.g., for reception) of antenna element(s) and/or transmit/receive chains corresponding to antenna element(s). For example, responder sets of antenna settings 520a-b may differently weight input signals to and/or output signals from antenna element(s) (and/or transmit/receive chains) when the responder 504 applies input signals to be transmitted and/or combines output signals that are received.

The initiator 502 and the responder 504 may be configured for relatively high-frequency communication, such as millimeter wave (mmWave) communication in 60 GHz. Such relatively high-frequency communication may be based on beamforming, e.g., using phased arrays at both sides for achieving a satisfactory link. In order to achieve a satisfactory link the initiator 502 and the responder 504 may perform beamforming training. For beamforming training, the initiator 502 and the responder 504 may exchange one or more training signals in order to respectively determine (e.g., identify) one or more sets of antenna settings (e.g., antenna weight vectors, phasings, etc.) for one or more paths over which the initiator 502 and the responder 504 may communicate. For example, the initiator 502 and the responder 504 may each perform a sector sweep following by a beam refining phase. During the sector sweep, each transmission may be sent using a different sector (e.g., covering a directional beam of a certain width) identified in a frame of the sector sweep, which may provide sufficient signaling to allow both the initiator 502 and the responder 504 to determine one or more sets of antenna settings for both transmission and reception.

Due to the high frequency and directional nature of beamforming, paths between the initiator 502 and the responder 504 may be susceptible to interference (e.g., blockers) that attenuate signals. However, paths between the initiator 502 and the responder 504 may be realized by way of reflected signals. For example, even when a LoS path between the initiator 502 and the responder 504 is attenuated due to a blocker, the initiator 502 and the responder 504 may still achieve a satisfactory link over a path that is reflected (e.g., around the blocker).

In the illustrated aspect, the initiator 502 and the responder 504 may perform beamforming training to identify at least two paths 522, 524 between the initiator 502 and the responder 504. For example, the initiator 502 and the responder 504 may identify a first path 522. At the initiator 502, the first path 522 may correspond to the initiator first antenna setting 510a (e.g., at least one antenna element of the initiator 502 configured with the initiator first antenna setting 510a). At the responder 504, the first path 522 may correspond to the responder first antenna setting 520a (e.g., at least one antenna element of the responder 504 configured with the responder first antenna setting 520a). In an aspect, the first path may be an LoS path. In other aspects, the first path may be a reflected path.

Similarly, the initiator 502 and the responder 504 may identify a second path 524. At the initiator 502, the second path 524 may correspond to the initiator second antenna setting 510b (e.g., at least one antenna element of the initiator 502 configured with the initiator second antenna setting 510b). At the responder 504, the second path 524 may correspond to the responder second antenna setting 520b (e.g., at least one antenna element of the responder 504 configured with the responder second antenna setting 520b). In an aspect, the second path 524 may be a reflected path.

In aspects, the first path 522 may be obstructed by a blocker 550, such as a person, an object, and the like. The blocker 550 may cause signal attenuation on the first path 522. Although reflected, the second path 524 may offer better channel conditions (e.g., higher SNR, lower attenuation, etc.) than the first path 522. Accordingly, the initiator 502 and the responder 504 may select the second path 524 for communication. However, the second path 524 may have a relatively longer distance than the first path 522.

Due to the difference between the first path 522 and the second path 524, an FTM session may be less accurate when frames are exchanged over the second path 524 than when frames are exchanged over the first path 522. Thus, the initiator 502 may prefer the first path 522 for a portion of frames of an FTM session instead of the second path 524. While signal communication over the first path 522 may be attenuated due to the blocker 550, signal quality may still be sufficient for measuring ToA and ToD. Therefore, the processing system 506 of the initiator 502 may select the first path 522 for a portion of one or more frames of an FTM session. For example, the processing system 506 of the initiator 502 may select the first path 522 for communication of one or more TRN fields of one or more frames, e.g., because the processing system 506 of the initiator 502 may be capable of detecting a TRN field on the first path 522.

However, other fields (e.g., a data field) of one or more frames may be communicated over the second path 524, e.g., because the blocker 550 may cause interference/attenuation that prevents detection/decoding of data carried in a data field.

Because the initiator 502 and the responder 504 may be configured to use the second path 524 for communication (e.g., because the second path 524 provides better channel conditions than the first path 522), the initiator 502 may perform a negotiation portion 540a of an FTM session with the responder 504 using the second path 524. As described, supra, the negotiation portion 540a may include, for example, the initial FTM request frame 422, the ACK message 424, the first FTM measurement frame 426, and/or the ACK message 428.

After the negotiation portion 540a of the FTM session, the initiator 502 may indicate, to the responder 504, that the measurement portion 540c of the FTM session is to occur over the first path 522 and the second path 524. In other words, a first portion of each frame of the measurement portion 540c is to be communicated over the second path 524, whereas a second portion of each frame of the measurement portion 540c is to be communicated over the first path 522.

Figure 6:
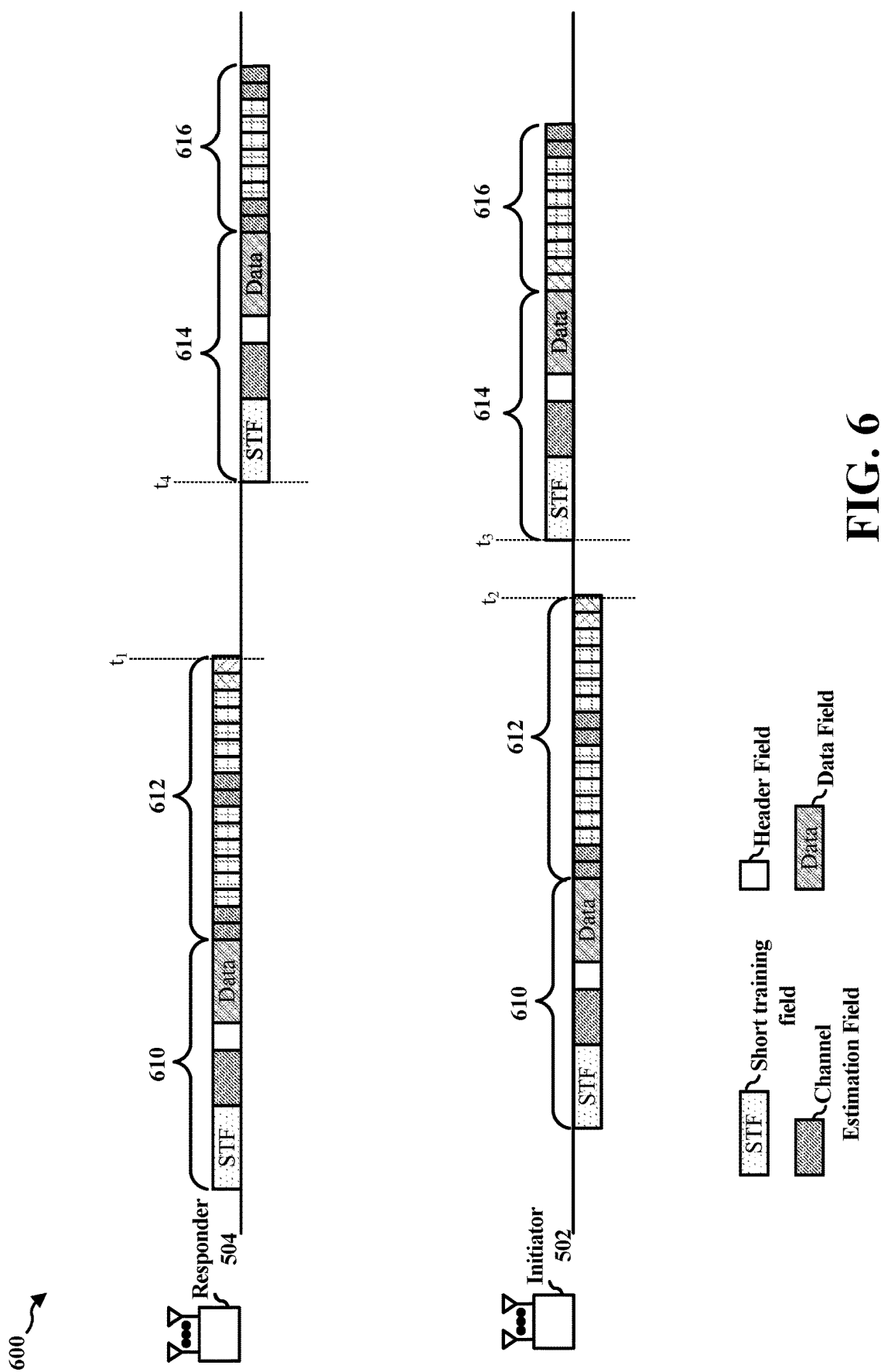
FIG. 6 illustrates a diagram of a wireless communications system, in accordance with certain aspects of the disclosure.

With reference to FIG. 6, a wireless communications system 600 is illustrated, including the initiator 502 and the responder 504. As illustrated, the responder 504 may be configured to transmit a second FTM measurement frame that includes a first portion 610 and a second portion 612. In one aspect, the second FTM measurement frame 434 may be comprised of the first portion 610 and the second portion 612. In aspects, the first portion 610 may include a short training field (STF), a channel estimation field (CEF), a header field, and a data field. In one aspect, at least one field of the first portion 610 (e.g., the header field) may include therein an indication that each second portion (e.g., the second portion 612) of frames of the FTM burst are to occur over the first path 522. In an aspect, this indication may be a bit set to a predetermined value. The second portion 612 may include at least one TRN field. In aspects, the at least one TRN field may comprise a TRN unit and/or TRN subfield(s) carrying a set of Golay sequences. In one aspect, the at least one TRN field may include a CEF.

Returning to FIG. 5, the processing system 506 of the initiator 502 may generate an FTM request frame 540b that includes a trigger field. The processing system 506 of the initiator 502 may set the trigger field to a value indicating that a first portion (e.g., STF, CEF, header field, and data field) of one or more frames of the measurement portion 540c is to occur over the second path 524 instead of the first path 522, whereas a second portion (e.g., at least one TRN field) is to occur over the first path 522 instead of the second path 524. In various aspects, the value indicating that the at least one TRN field of one or more frames of the measurement portion 540c of the FTM session is to occur over the first path 522 instead of the second path 524 may be predefined. For example, the value may be predefined to correspond to a path having a shortest distance. The first interface 508a of the initiator 502 may output the FTM request frame 540b for transmission to the responder 504, for example, using the second antenna setting 510b corresponding to the second path 524.

In one aspect, the processing system 506 of the initiator 502 may receive an ACK message from the responder 504 (e.g., the ACK message 432), which may indicate that the responder 504 acknowledges the switch to the first path 522 for the measurement portion 540c of the FTM session.

The first interface 518a of the responder 504 may be configured to obtain the FTM request frame 540b over the second path 524 using the responder second antenna setting 520b.

For the measurement portion 540c, the processing system 516 of the responder 504 may generate a second FTM measurement frame (e.g., the second FTM measurement frame 434) of the measurement portion 540c. For example, the processing system 516 of the responder 504 may generate a second FTM measurement frame that includes the first portion 610 and the second portion 612. As described, supra, the second FTM measurement frame may include a ToA and/or ToD (e.g., set to zero) in the data field of the first portion 610. The processing system 516 of the responder 504 may include, in the second FTM measurement frame, at least one TRN field as the second portion 612.

The second interface 518b of the responder 504 may be configured to output the second FTM measurement frame for transmission to the initiator 502 using the responder second antenna setting 520b for the first portion 610 and using the responder first antenna setting 520a for the second portion 612. Accordingly, the responder 504 may transmit the first portion 610 over the second path 524 and may transmit the second portion 612 over the first path 522.

The processing system 516 of the responder 504 may record the ToD time $t_{1,1}$ of the second FTM measurement frame. In one aspect, the processing system 516 may record the ToD time $t_{1,1}$ of the second FTM measurement frame from the end of the second portion 612 (e.g., from the end of the last TRN field).

The second interface 508b of the initiator 502 may be configured to obtain the second FTM measurement frame of the measurement portion 540c of the FTM session. In an aspect, the second interface 508b of the initiator 502 may obtain the second FTM measurement frame using the initiator second antenna setting 510b for reception of the first portion 610 and using the initiator first antenna setting 510a for reception of the second portion 612. That is, the initiator 502 may receive the first portion 610 of the second FTM measurement frame over the second path 524 and may receive the second portion 612 of the second FTM measurement frame over the first path 522.

The processing system 506 of the initiator 502 may be configured to record the ToA time $t_{2,1}$ of the second FTM measurement frame (e.g., using the at least one TRN field of the second FTM measurement frame). In an aspect, the processing system 506 of the initiator 502 may record the ToA time $t_{2,1}$ of the second FTM measurement frame at the end of the second portion 612 (e.g., from the end of the last TRN field).

Continuing with the measurement portion 540c of the FTM session using the first path 522, the processing system 506 of the initiator 502 may be configured to generate a first ACK frame (e.g., the first ACK frame 436). The processing system 506 may generate the first ACK frame to include a first portion 614 and a second portion 616, as illustrated in FIG. 6. The first portion 614 may include at least one of an STF, a CEF, a header field, and/or a data field. In an aspect, the data field may carry ACK/NACK feedback related to the second FTM measurement frame. In one aspect, at least one field of the first portion 614 (e.g., the header field) may include therein an indication that each second portion (e.g., the second portion 616) of frames of the FTM burst are to occur over the first path 522. In an aspect, this indication may be a bit set to a predetermined value. The second portion 616 may include at least one TRN field. The second portion 612 may include at least one TRN field. In aspects, the at least one TRN field may comprise a TRN unit and/or TRN subfield(s) carrying a set of Golay sequences. In one aspect, the at least one TRN field may include a CEF.

The first interface 508a of the initiator 502 may be configured to output the first ACK frame for transmission to the responder 504 over the first path 522 using the initiator first antenna setting 510a and the second path 524 using the initiator second antenna setting 510b. That is, the first interface 508a of the initiator 502 may output the first ACK frame for transmission to the responder 504 using the initiator second antenna setting 510b for the first portion 614 and using the initiator first antenna setting 510a for second portion 616.

The processing system 506 of the initiator 502 may record the ToD time $t_{3,1}$ of the first ACK frame. In one aspect, the processing system 506 of the initiator 502 may record the ToD time $t_{3,1}$ of the first ACK frame at the beginning of the first ACK frame, such as at the STF. In another aspect, the processing system 506 of the initiator 502 may record the ToD time $t_{3,1}$ of the first ACK frame at the at least one TRN field (e.g., at the end of the first ACK frame).

The first interface 518a of the responder 504 may be configured to obtain the first ACK frame over the first path 522 using the responder first antenna setting 520a and the second path 524 using the responder second antenna setting 520b. That is, the first interface 518a of the responder 504 may obtain the first ACK frame using the responder second antenna setting 520b for reception of the first portion 614 and using the responder first antenna setting 520a for reception of the second portion 616. Accordingly, the responder 504 may receive the first portion 614 of the first ACK frame over the second path 524 and may receive the second portion 616 of the first ACK frame over the first path 522.

The processing system 516 of the responder 504 may record the ToA time $t_{4,1}$ of the first ACK frame. In one aspect, the processing system 516 of the responder 504 may record the ToA time $t_{4,1}$ of the first ACK frame at a beginning of the first ACK frame (e.g., at the STF, or potentially the CEF). In another aspect, the processing system 516 of the responder 504 may record the ToA time $t_{4,1}$ of the first ACK frame at an end of the first ACK frame (e.g., at the end of at least one TRN field).

In an aspect, the processing system 516 of the responder 504 may measure the AoA of the first ACK frame. In an aspect, this exchange of the second FTM frame and the first ACK frame may comprise at least a portion of a first FTM burst.

The processing system 516 of the responder 504 may be configured to generate a third FTM measurement frame (e.g., the third FTM measurement frame 438) of the measurement portion 540c of the FTM session. The processing system 516 of the responder 504 may include, in the third FTM measurement frame, information indicating the ToD time $t_{1,1}$ and the ToA time $t_{4,1}$, for example, in a data field of the third FTM measurement frame (e.g., similar to the data field of the first portion 610 of the second FTM measurement frame). In one aspect, the processing system 516 of the responder 504 may include the measured AoA in the third FTM measurement frame, e.g., in the data field.

The second interface 518b of the responder 504 may output the third FTM measurement frame for transmission to the initiator 502 using the responder second antenna setting 520b for a first portion (e.g., STF, CEF, header field, and/or data field) of the third FTM measurement frame and using the responder first antenna setting 520a for a second portion (e.g., at least one TRN field) of the third FTM measurement frame. Thus, the responder 504 may transmit the third FTM measurement frame over both the first path 522 (e.g., for the at least one TRN field) and the second path 524 (e.g., for the STF, CEF, header field, and/or data field).

In some aspects, the processing system 516 of the responder 504 may record a ToD time $t_{1,2}$ for a next FTM burst. For example, the processing system 516 of the responder 504 may record a ToD time $t_{1,2}$ at the end of the third FTM measurement frame (e.g., at the at least one TRN field of the third measurement frame). In another aspect, the processing system 516 of the responder 504 may record a ToD time $t_{1,2}$ at the beginning of the third FTM measurement frame (e.g., at the STF or potentially the CEF).

The second interface 508b of the initiator 502 may obtain the third FTM measurement, e.g., using the initiator first antenna setting 510a for reception of the first portion (e.g., STF, CEF, header field, and/or data field) of the third FTM measurement frame and using the initiator second antenna setting 510b for reception of the second portion (e.g., at least one TRN field) of the third FTM measurement frame. The processing system 506 of the initiator 502 may detect the ToD time $t_{1,1}$ and the ToA time $t_{4,1}$ indicated in the third FTM measurement frame.

Based on ToD time $t_{1,1}$, ToA time $t_{2,1}$, ToD time $t_{3,1}$, and the ToA time $t_{4,1}$, the processing system 506 of the initiator 502 may be configured to determine a position of the initiator 502. For example, the processing system 506 of the initiator 502 may be configured to estimate an RTT based on the difference of $(t_{4,1}-t_{1,1})-(t_{3,1}-t_{2,1})$. In some aspects, the processing system 506 of the initiator 502 may be configured to determine a position of the initiator 502 based on the AoA indicated in the third FTM measurement frame.

In aspects, the determined position of the initiator 502 may be used for any number of different purposes. For example, the determined position may be provided to a higher layer (e.g., application layer). Therefore, the processing system 506 of the initiator 502 may provide the determined position to an application of the initiator 502. In another example, the determined position may be transmitted to a server (e.g., location server). Therefore, the processing system 506 of the initiator 502 may generate a message (e.g., a frame) that indicates the determined position, and the first interface 508a of the initiator 502 may output the message for transmission to a server.

As described, supra, the measurement portion 540c of the FTM session may include additional FTM bursts for which the processing system 506 of the initiator 502 may estimate or refine RTT measurements. Correspondingly, the processing system 506 of the initiator 502 may determine (e.g., estimate or refine) the position of the initiator 502 based on the additional FTM bursts.

In some aspects, the responder 504 may indicate, to the initiator 502, that a contention free period has concluded. For example, the responder 504 may determine that the wireless medium (e.g., including a channel used for communication between the responder 504 and the initiator 502) is no longer free of contention (e.g., when other apparatuses are to begin communication on the wireless medium). Therefore, the responder 504 may indicate, to the initiator 502, that communication over the wireless medium is to conclude, which may conclude an FTM session. The processing system 516 of the responder 504 may generate a CF end frame, e.g., to indicate that the wireless medium is no longer free of contention. The first interface 518a of the responder 504 may output the CF end frame for transmission to the initiator 502 (e.g., over the second path 524 using the responder second antenna setting 520b). The second interface 508b of the initiator 502 may obtain the CF end frame. The processing system 506 of the initiator 502 may determine that communication over the wireless medium is to conclude based on the CF end frame. For example, the processing system 506 of the initiator 502 may end the FTM session.

In some aspects, the initiator 502 may indicate to the responder 504 that communication should resume on the second path 524 (e.g., in order to return to better channel conditions), instead of using both the first path 522 and the second path 524 for different portions of a same frame. In various aspects, the processing system 506 of the initiator 502 may generate a frame 542 that indicates, to the responder 504, that communication between the initiator 502 and the responder 504 should occur on the second path 524 after the measurement portion 540c of the FTM session. The first interface 508a of the initiator 502 may output the frame 542 for transmission to the responder 504, for example, over the first path 522 using the initiator first antenna setting 510a or over the second path 524 using the initiator second antenna setting 510b. In aspects, the processing system 506 of the initiator 502 may select the initiator second antenna setting 510b after the frame 542 is output for transmission to the responder 504.

The first interface 518a of the responder 504 may be configured to obtain the frame 542 over the first path 522 using the responder first antenna setting 520a or over the second path 524 using the responder second antenna setting 520b. Based on the frame 542, the processing system 516 of the responder 504 may be configured select the responder second antenna setting 520b for communication with the initiator 502 over the second path 524.

In one aspect, the frame 542 may be a contention-free (CF) end frame. The CF end frame may indicate that the frame exchange has concluded and communication should resume on the second path 524. In some aspects, the processing system 516 of the responder 504 may generate a second CF end frame responsive to the received CF end frame, and the second interface 518b may be configured to output the second CF end frame for transmission to the initiator 502.

In another aspect, the frame 542 may be an FTM request frame having a trigger field. The processing system 506 of the initiator 502 may set the trigger field to a value indicating that the measurement portion 540c of the FTM session has concluded and communication should resume on the second path 524. The processing system 516 of the responder 504 may be configured to generate an ACK message responsive to the final FTM request frame, and the second interface 518b may be configured to output the ACK message for transmission to the initiator 502.

Figure 7:
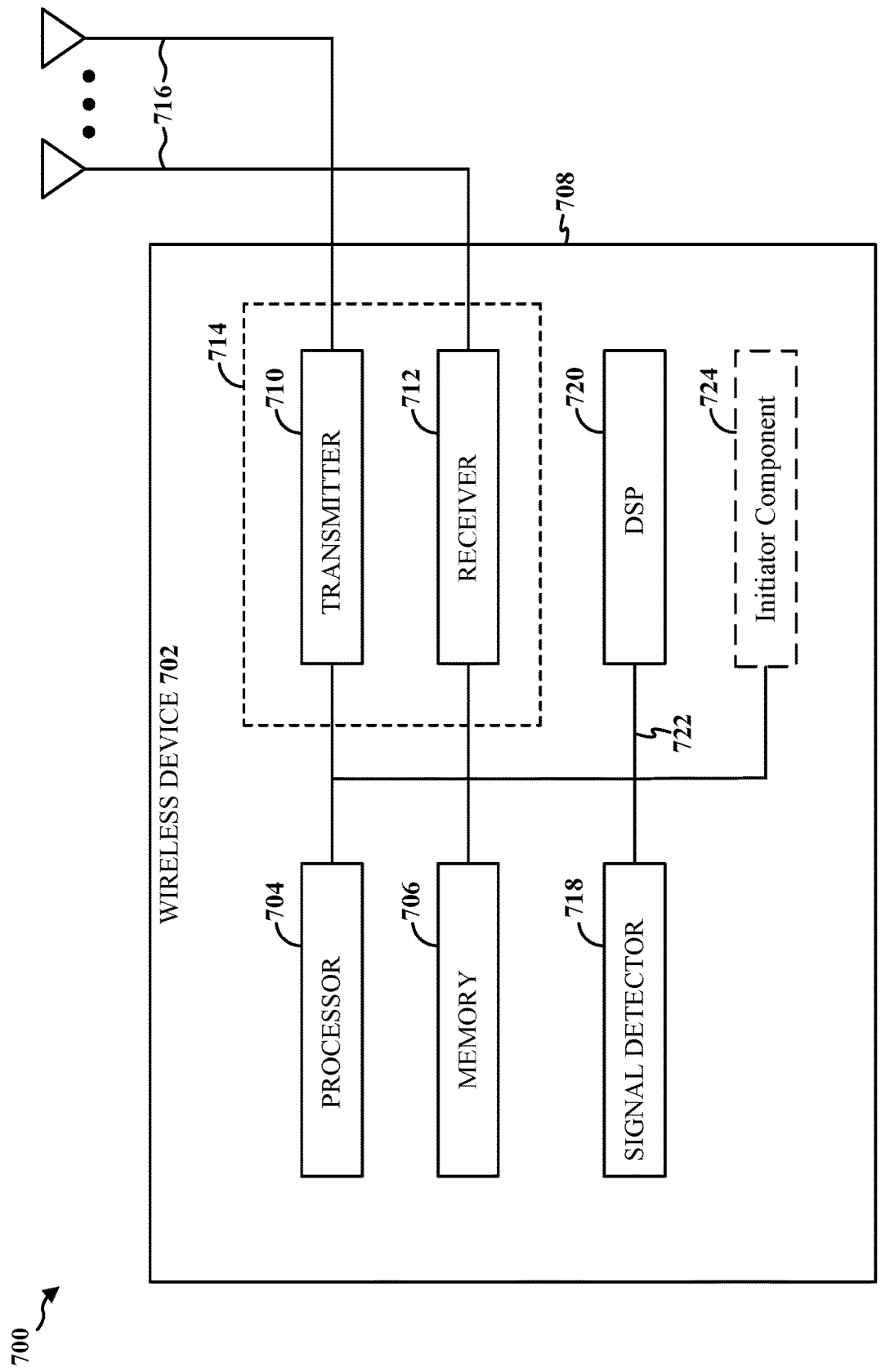
FIG. 7 shows an example functional block diagram of a wireless device configured as an initiator using an FTM protocol, in accordance with certain aspects of the present disclosure.

FIG. 7 shows an example functional block diagram of a wireless device 702 configured for communication according to an FTM protocol. The wireless device 702 may be an initiator of an FTM session. The wireless device 702 is an example of a device that may be configured to implement the various methods described herein. For example, the wireless device 702 may be the AP 110, the UT 120, the initiator 402, and/or the initiator 502.

The wireless device 702 may include a processor 704 which controls operation of the wireless device 702. The processor 704 may also be referred to as a central processing unit (CPU). Memory 706, which may include both read-only memory (ROM) and random access memory (RAM), may provide instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable (by the processor 704, for example) to implement the methods described herein.

The wireless device 702 may also include a housing 708, and the wireless device 702 may include a transmitter 710 and a receiver 712 to allow transmission and reception of data between the wireless device 702 and a remote device. The transmitter 710 and receiver 712 may be combined into a transceiver 714. A single transmit antenna or a plurality of transmit antennas 716 may be attached to the housing 708 and electrically coupled to the transceiver 714. The wireless device 702 may also include multiple transmitters, multiple receivers, and multiple transceivers.

The wireless device 702 may also include a signal detector 718 that may be used in an effort to detect and quantify the level of signals received by the transceiver 714 or the receiver 712. The signal detector 718 may detect such signals as total energy, energy per subcarrier per symbol, power spectral density and other signals. The wireless device 702 may also include a digital signal processor (DSP) 720 for use in processing signals. The DSP 720 may be configured to generate a packet for transmission. In some aspects, the packet may comprise a physical layer convergence procedure (PLCP) protocol data unit (PPDU).

The various components of the wireless device 702 may be coupled together by a bus system 722, which may include a power bus, a control signal bus, and a status signal bus in addition to a data bus.

In one configuration, when the wireless device 702 is implemented as an initiator of an FTM session according to an FTM protocol, the wireless device 702 may include an initiator component 724. The initiator component 724 may identify a first set of antenna settings and a second set of antenna settings based on beamforming training with a second apparatus, the first set of antenna settings corresponding to a first path with the second apparatus having a relatively lower channel quality but relatively shorter distance than a second path with the second apparatus corresponding to the second set of antenna settings. The initiator component 724 may generate a first FTM request frame including an indication to use the first path instead of the second path for at least one TRN field of a first FTM measurement frame. The initiator component 724 may output the first FTM request frame for transmission to the second apparatus. The initiator component 724 may obtain, from the second apparatus, a first FTM measurement frame using the second set of antenna settings for reception of one or more first fields of the first FTM measurement frame and using the first set of antenna settings for reception of the at least one TRN field of the first FTM measurement frame.

In an aspect, the first FTM request frame comprises a trigger field, and the indication to use the first path instead of the second path comprises a value of the trigger field. The initiator component 724 may further generate, based on the first FTM measurement frame, a first ACK frame including one or more first fields and including at least one TRN field, and further output the first ACK frame for transmission to the second apparatus using the second set of antenna settings for the one or more first fields of the first ACK frame and using the first set of antenna settings for the at least one TRN field of the first ACK frame. In an aspect, the one or more first fields of the first ACK frame comprise at least one of an STF, a CEF, a header field, or a data field. In an aspect, the header field includes one or more bits indicating use of the first path instead of the second path for the at least one TRN field of the first ACK frame. The initiator component 724 may further obtain, from the second apparatus, a second FTM measurement frame using the second set of antenna settings for reception of one or more first fields of the second FTM measurement frame and using the first set of antenna settings for reception of at least one TRN field of the second FTM measurement frame, the one or more first fields of the second FTM measurement frame including a data field indicating a time of departure $t_1$ associated with the first FTM measurement frame and a time of arrival $t_4$ associated with the first ACK frame, and further determine a position of the wireless device 702 based on the time of departure $t_1$ and the time of arrival $t_4$.

The initiator component 724 may further store a time of arrival $t_2$ associated with the at least one TRN field of the first FTM measurement frame, store a time of departure $t_3$ associated with the first ACK frame, and determine the position of the wireless device 702 further based on the time of arrival $t_2$ and the time of departure $t_3$. In an aspect, the one or more first fields of the second FTM measurement frame include a data field that indicates an angle of arrival associated with the first ACK frame, and initiator component 724 may further determine the position of the wireless device 702 further based on the angle of arrival.

In one aspect, the initiator component 724 may output the position of the wireless device 702 to an application layer of the wireless device 702. In one aspect, initiator component 724 may output a message that indicates the position of the wireless device 702 for transmission to a server.

Figure 8:
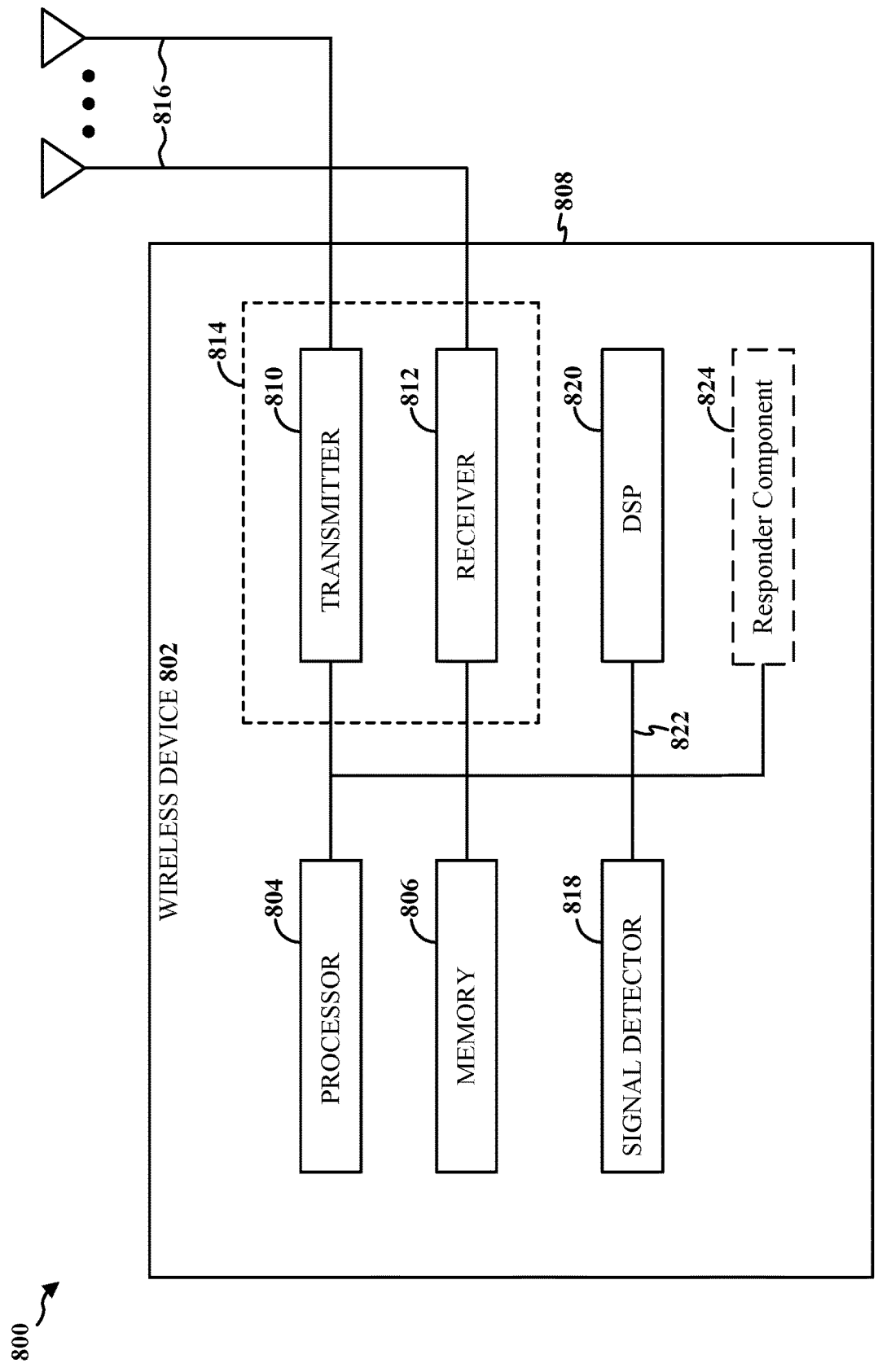
FIG. 8 shows an example functional block diagram of a wireless device configured as a responder using an FTM protocol, in accordance with certain aspects of the present disclosure.

FIG. 8 shows an example functional block diagram of a wireless device 802 configured for communication according to an FTM protocol. The wireless device 802 may be a responder of an FTM session. The wireless device 802 is an example of a device that may be configured to implement the various methods described herein. For example, the wireless device 802 may be the AP 110, the UT 120, the responder 404, and/or the responder 504.

The wireless device 802 may include a processor 804 which controls operation of the wireless device 802. The processor 804 may also be referred to as a central processing unit (CPU). Memory 806, which may include both read-only memory (ROM) and random access memory (RAM), may provide instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable (by the processor 804, for example) to implement the methods described herein.

The wireless device 802 may also include a housing 808, and the wireless device 802 may include a transmitter 810 and a receiver 812 to allow transmission and reception of data between the wireless device 802 and a remote device. The transmitter 810 and receiver 812 may be combined into a transceiver 814. A single transmit antenna or a plurality of transmit antennas 816 may be attached to the housing 808 and electrically coupled to the transceiver 814. The wireless device 802 may also include multiple transmitters, multiple receivers, and multiple transceivers.

The wireless device 802 may also include a signal detector 818 that may be used in an effort to detect and quantify the level of signals received by the transceiver 814 or the receiver 812. The signal detector 818 may detect such signals as total energy, energy per subcarrier per symbol, power spectral density and other signals. The wireless device 802 may also include a digital signal processor (DSP) 820 for use in processing signals. The DSP 820 may be configured to generate a packet for transmission. In some aspects, the packet may comprise a physical layer convergence procedure (PLCP) protocol data unit (PPDU).

The various components of the wireless device 802 may be coupled together by a bus system 822, which may include a power bus, a control signal bus, and a status signal bus in addition to a data bus.

In one configuration, when the wireless device 802 is implemented as a responder of an FTM session according to an FTM protocol, the wireless device 802 may include a responder component 824. The responder component 824 may obtain a first FTM request frame including an indication to use a first path with a second apparatus for communicating at least one TRN field of a first FTM measurement frame, the first path having a relatively lower channel quality but relatively shorter distance than a second path with the second apparatus. The responder component 824 may identify, based on beamforming training with the second apparatus, a first set of antenna settings corresponding to the first path with the second apparatus and a second set of antenna settings corresponding to the second path with the second apparatus. The responder component 824 may generate, based on the first FTM request frame, the first FTM measurement frame including one or more first fields and the at least one TRN field. The responder component 824 may output the first FTM measurement frame for transmission to the second apparatus using the second set of antenna settings for one or more first fields of the first FTM measurement frame and using the first set of antenna settings for the at least one TRN field of the first FTM measurement frame. In an aspect, the first FTM request frame comprises a trigger field, the indication to use the first path instead of the second path comprises a value of the trigger field, and the output of the first FTM measurement frame for transmission to the second apparatus using the second set of antenna settings for the one or more first fields of the first FTM measurement frame and using the first set of antenna settings for the at least one TRN field of the first FTM measurement frame is based on the value of the trigger field. In an aspect, the one or more first fields of the first FTM measurement frame comprise at least one of an STF, a CEF, a header field, or a data field. In an aspect, the header field includes one or more bits indicating use of the first path instead of the second path for the at least one TRN field of the first FTM measurement frame. The responder component 824 may further obtain, from the second apparatus, a first ACK frame using the second set of antenna settings for reception of one or more first fields of the first ACK frame and using the first set of antenna settings for reception of at least one TRN field of the first ACK frame. The responder component 824 may further store a time of departure $t_1$ associated with the at least one TRN field of the first FTM measurement frame, store a time of arrival $t_4$ associated with the first ACK frame, and generate a second FTM measurement frame including one or more first fields and at least one TRN field, the one or more first fields including a data field that indicates the time of departure $t_1$ and the time of arrival $t_4$. The responder component 824 may further output the second FTM measurement frame for transmission to the second apparatus using the second set of antenna settings for the one or more first fields of the second FTM measurement frame and using the first set of antenna settings for the at least one TRN field of the second FTM measurement frame. In an aspect, the responder component 824 is further configured to measure an angle of arrival of the first ACK frame, the measured angle of arrival being included in the data field of the second FTM measurement frame.

Figure 9:
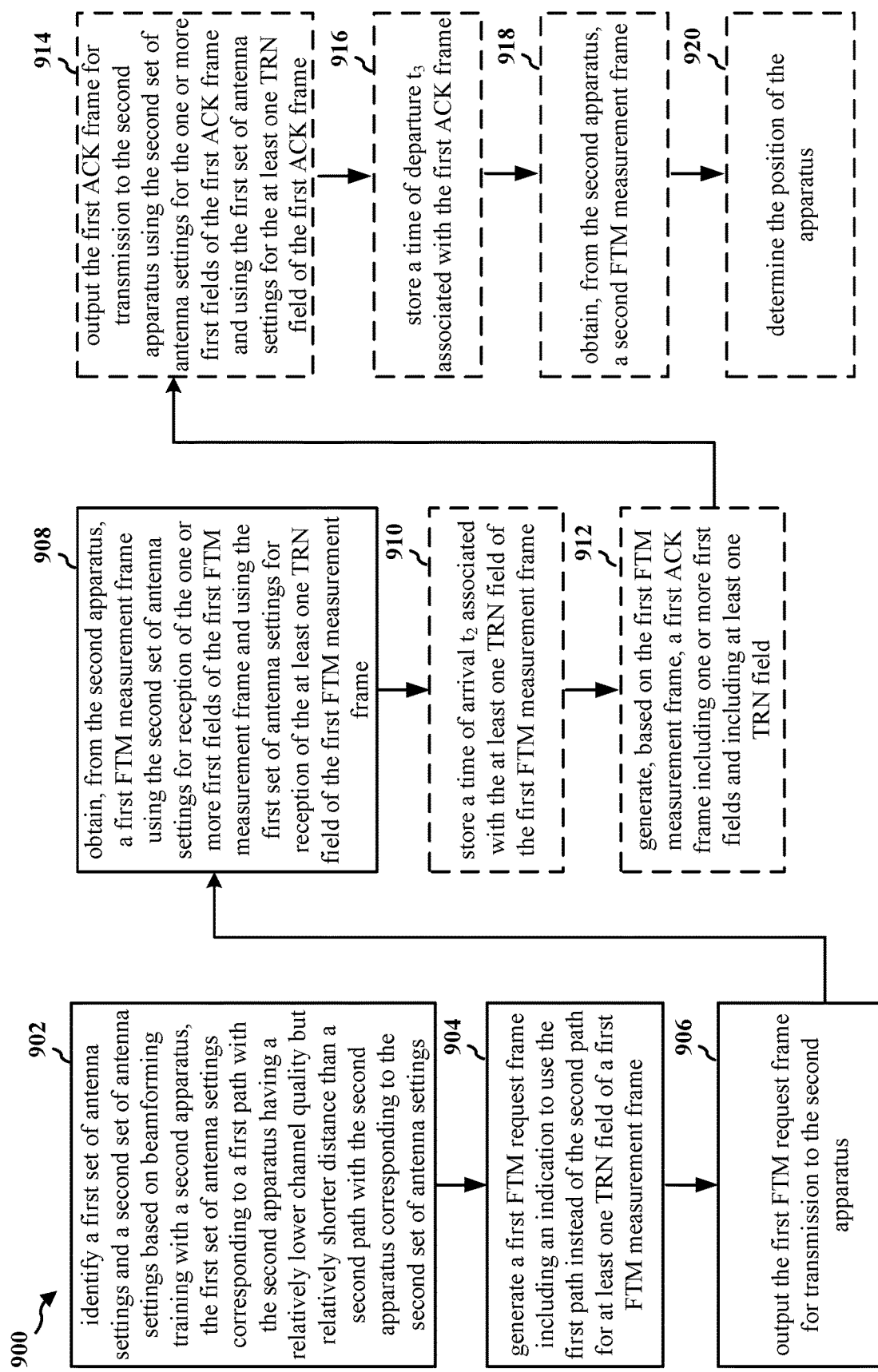
FIG. 9 is a flowchart of an example method of initiating an FTM session, in accordance with certain aspects of the present disclosure.

FIG. 9 is a flowchart of an example method 900 of initiating an FTM session according to an FTM protocol, for example, in order to determine a position of an apparatus. The method 900 may be performed using an apparatus (e.g., a UT 120, the initiator 402, the initiator 502, the wireless device 702, and/or the initiator component 724). Although the method 900 is described below with respect to the elements of the initiator 402 and/or the initiator 502, other components may be used to implement one or more of the operations described herein. Blocks denoted by dotted lines may represent optional operations.

At block 902, an apparatus may identify a first set of antenna settings and a second set of antenna settings based on beamforming training with a second apparatus, the first set of antenna settings corresponding to a first path with the second apparatus having a relatively lower channel quality but relatively shorter distance than a second path with the second apparatus corresponding to the second set of antenna settings. For example, referring to FIG. 5, the processing system 506 of the initiator 502 may identify the initiator first antenna setting 510a and the initiator second antenna setting 510b based on beamforming training with the responder 504. In an aspect, the initiator first antenna setting 510a may correspond to the first path 522 with the responder 504 having a relatively lower channel quality but relatively shorter distance than the second path 524 with the responder 504 corresponding to the initiator second antenna setting 510b.

At block 904, the apparatus may generate a first FTM request frame including an indication to use the first path instead of the second path for at least one TRN field of a first FTM measurement frame. In an aspect, the first FTM request frame comprises a trigger field (e.g., associated with an FTM session), and the indication to use the first path instead of the second path comprises a value of the trigger field. For example, referring to FIG. 4, the initiator 402 may generate the FTM request frame 430, including a trigger field having a value set to indicate to use a first path for at least one TRN field of a first FTM measurement frame instead of a second path. For example, referring to FIGS. 5 and 6, the processing system 506 of the initiator 502 may generate the FTM request frame 540b that indicates the first path 522 is to be used for at least the second portion 612 of the second FTM measurement frame of the measurement portion 540c of the FTM session. In aspects, the FTM request frame 540b may indicate that the second path 524 is to be used for at least the first portion 610 of the second FTM measurement frame of the measurement portion 540c of the FTM session.

At block 906, the apparatus may output the first frame for transmission to the second apparatus. For example, referring to FIG. 4, the initiator 402 may output the FTM request frame 430 for transmission to the responder 404. For example, referring to FIG. 5, the first interface 508a of the initiator 502 may output the FTM request frame 540b for transmission to the responder 504, e.g., over the second path 524 using the initiator second antenna setting 510b.

At block 908, the apparatus may obtain, from the second apparatus, a first FTM measurement frame using the second set of antenna settings for reception of one or more first fields of the first FTM measurement frame and using the first set of antenna settings for reception of the at least one TRN field of the first FTM measurement frame. For example, referring to FIG. 4, the initiator 402 may obtain at least one of the second FTM measurement frame 434, the third FTM measurement frame 438, the fourth FTM measurement frame 442, and/or the fifth FTM measurement frame 446. For example, referring to FIG. 5, the second interface 508b of the initiator 502 may be configured to obtain, from the responder 504, a second FTM measurement frame using the initiator second antenna setting 510b for reception of the first portion 610 of the second FTM measurement frame and using the initiator first antenna setting 510a for reception of the second portion 612 of the second FTM measurement frame.

At block 910, the apparatus may store a time of arrival $t_2$ associated with the at least one TRN field of the first FTM measurement frame. For example, referring to FIG. 4, the initiator 402 may store a ToA $t_{2,1}$ of the second FTM measurement frame 434, e.g., as detected at the at least one TRN field of the second measurement frame 434. For example, referring to FIGS. 5 and 6, the processing system 506 of the initiator 502 may store a ToA $t_2$ of the second FTM measurement frame. In aspects, the processing system 506 of the initiator 502 may detect the ToA $t_2$ at the end of the second portion 612 (e.g., at the at least one TRN field) of the second FTM measurement frame.

At block 912, the apparatus may generate, based on the first FTM measurement frame, a first ACK frame including one or more first fields and including at least one TRN field. In an aspect, the one or more first fields of the first ACK frame may include an STF, a CEF, a header field, and/or a data field. In an aspect, the header field of the first ACK frame may include one or more bits indicating use of the first path instead of the second path for the at least one TRN field of the first ACK frame. For example, referring to FIG. 4, the initiator 402 may generate the first ACK frame 436 that includes the at least one TRN field. The first ACK frame 436 may include acknowledgement information associated with the second FTM measurement frame 434. For example, referring to FIGS. 5 and 6, the processing system 506 of the initiator 502 may be configured to generate a first ACK frame of the measurement portion 540c of the FTM session based on the second FTM measurement frame of the FTM session. In an aspect, the processing system 506 of the initiator 502 may generate the first ACK frame to include the first portion 614 and the second portion 616.

At block 914, the apparatus may output the first ACK frame for transmission to the second apparatus using the second set of antenna settings for the one or more first fields of the first ACK frame and using the first set of antenna settings for the at least one TRN field of the first ACK frame. For example, referring to FIG. 4, the initiator 402 may output the first ACK frame 436 for transmission to the responder 404 using a second set of antenna settings for a first portion of the first ACK frame and using a first set of antenna settings for a second portion (e.g., at least one TRN field) of the first ACK frame. For example, referring to FIGS. 5 and 6, the first interface 508a of the initiator 502 may output an ACK frame of the measurement portion 540c of the FTM session for transmission to the responder 504 using the initiator second antenna setting 510b for the first portion 614 and using the initiator first antenna setting 510a for the second portion 616.

At block 916, the apparatus may store a time of departure $t_3$ associated with the first ACK frame. In one aspect, the apparatus may store the time of departure $t_3$ as detected from a beginning of the first ACK frame (e.g., STF or potentially CEF). In another aspect, the apparatus may store the time of departure $t_3$ as detected from the end of the first ACK frame (e.g., the at least one TRN field). For example, referring to FIG. 4, the initiator 402 may store a ToA $t_{3,1}$ of the first ACK frame 436. For example, referring to FIGS. 5 and 6, the processing system 506 of the initiator 502 may store a ToD $t_3$ of the first ACK frame. In aspects, the processing system 506 of the initiator 502 may detect the ToD $t_3$ at the beginning of the first portion 614 (e.g., STF or CEF) or at the end of the second portion 616 (e.g., at the at least one TRN field).

At block 918, the apparatus may obtain, from the second apparatus, a second FTM measurement frame using the second set of antenna settings for reception of one or more first fields of the second FTM measurement frame and using the first set of antenna settings for reception of at least one TRN field of the second FTM measurement frame, the one or more first fields of the second FTM measurement frame including a data field indicating a time of departure $t_1$ associated with the first FTM measurement frame and a time of arrival $t_4$ associated with the first ACK frame. For example, referring to FIG. 4, the initiator 402 may obtain, from the responder 404, the third FTM measurement frame 438. The third FTM measurement frame 438 may include information indicating a ToD $t_{1,1}$ of the second FTM measurement frame 434 and a ToA $t_{4,1}$ of the first ACK frame 436. Referring to FIG. 5, the second interface 508b of the initiator 502 may obtain, from the responder 504, the third measurement frame using the initiator second antenna setting 510b for reception of one or more first fields (e.g., STF, CEF, header field, and/or data field) of the third FTM measurement frame and using the initiator first antenna setting 510a for reception of at least one TRN field of the third FTM measurement frame.

At block 920, the apparatus may determine a position of the apparatus. In an aspect, the apparatus may determine a position of the apparatus based on the ToD $t_1$, the ToA $t_2$, the ToD $t_3$, and the ToA $t_4$. The apparatus may estimate an RTT based on $t_1$, $t_2$, $t_3$, and $t_4$. The apparatus may use the estimated RTT to determine a position of the apparatus.

In an aspect, the second FTM measurement frame may include an AoA associated with the first ACK frame. The apparatus may be configured to determine the position of the apparatus further based on the indicated AoA.

According to various aspects, the apparatus may output the position of the apparatus to an application layer of the apparatus and/or the apparatus may output a message that indicates the position of the apparatus for transmission to a server.

Referring to FIG. 4, the initiator 402 may determine a position of initiator 402 based at least partially on the ToD $t_{1,1}$ of the second FTM measurement frame 434, the ToA $t_{2,1}$ of the second FTM measurement frame 434, the ToD $t_{3,1}$ of the first ACK frame 436, and the ToA $t_{4,1}$ of the first ACK frame 436. For example, the initiator 402 may estimate an RTT based on $t_{1,1}$, $t_{2,1}$, $t_{3,1}$, and $t_{4,1}$.

For example, referring to FIG. 5, the processing system 506 of the initiator 502 may determine a position of the initiator 502 based at least partially on a ToD $t_1$ of the second FTM measurement frame, the ToA $t_2$ associated with the second FTM measurement frame, the ToD $t_3$ associated with the first ACK frame, and the ToA $t_4$ associated with the first ACK frame of the measurement portion 540c of the FTM session. As described, supra, $t_1$ and $t_4$ may be received in a third FTM measurement frame, and $t_2$ and $t_3$ may be recorded by the processing system 506 of the initiator 502. The processing system 506 of the initiator 502 may estimate an RTT as the difference $(t_4-t_1)-(t_3-t_2)$. The processing system 506 of the initiator 502 may determine the position of the initiator 502 based at least partially on the estimated RTT.

Figure 10:
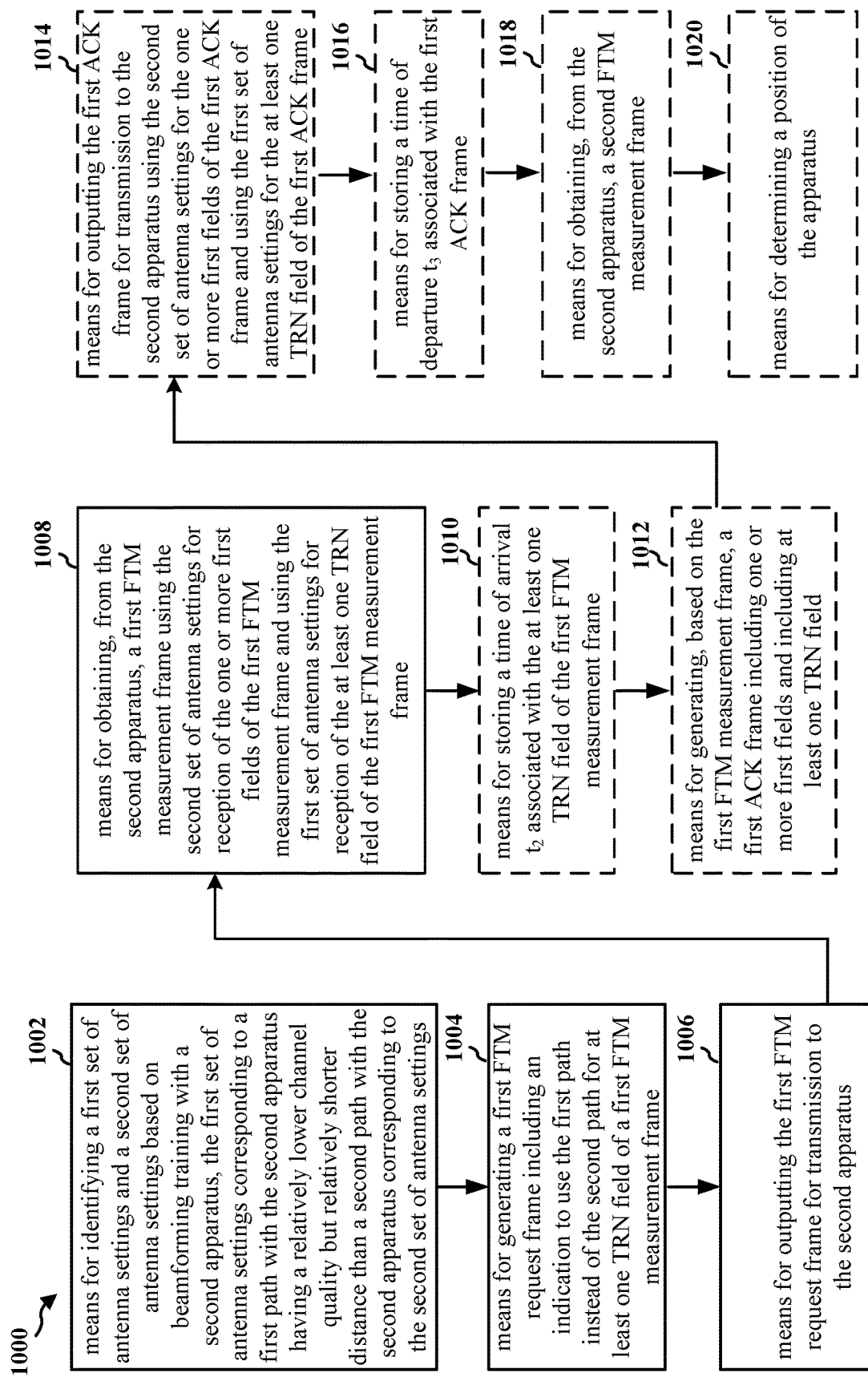
FIG. 10 illustrates exemplary means capable of performing the operations set forth in FIG. 9, in accordance with certain aspects of the present disclosure.

FIG. 10 illustrates exemplary means 1000 capable of performing the operations set forth in FIG. 9. The exemplary means 1000 may include means for identifying a first set of antenna settings and a second set of antenna settings based on beamforming training with a second apparatus 1002, the first set of antenna settings corresponding to a first path with the second apparatus having a relatively lower channel quality but relatively shorter distance than a second path with the second apparatus corresponding to the second set of antenna settings. Means 1002 may include, for example, controller 230, controllers 280, digital signal processor 720, and/or processor 704 shown in FIG. 2 and FIG. 7. Means 1002 may include, for example, the processing system 506 of FIG. 5. The exemplary means 1000 may include means for generating a first FTM request frame including an indication to use the first path instead of the second path for at least one TRN field of a first FTM measurement frame 1004. Means 1004 may include, for example, controller 230, controllers 280, digital signal processor 720, and/or processor 704 shown in FIG. 2 and FIG. 7. Means 1004 may include, for example, the processing system 506 of FIG. 5. The exemplary means 1000 may include means for outputting the first FTM request frame for transmission to the second apparatus 1006. Means 1006 may include, for example, an interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 716, transmitter 710, digital signal processor 720, and/or processor 704 shown in FIG. 2 and FIG. 7. Means 1006 may include, for example, the first interface 508a of FIG. 5. The exemplary means 1000 may include means for obtaining, from the second apparatus, a first FTM measurement frame using the second set of antenna settings for reception of one or more first fields of the first FTM measurement frame and using the first set of antenna settings for reception of the at least one TRN field of the first FTM measurement frame 1008. Means 1008 may include, for example, an interface (e.g., of a processor), antennas 224, antennas 252, receiver units 222, receiver units 254, RX spatial processor 240, RX spatial processors 260, RX data processor 242, RX data processors 270, controller 230, controllers 280, antennas 716, receiver 712, digital signal processor 720, and/or processor 704 shown in FIG. 2 and FIG. 7. Means 1008 may include, for example, the second interface 508b of FIG. 5. The exemplary means 1000 may include means for storing a time of arrival $t_2$ associated with the at least one TRN field of the first FTM measurement frame 1010. Means 1010 may include, for example, controller 230, controllers 280, digital signal processor 720, and/or processor 704 shown in FIG. 2 and FIG. 7. Means 1010 may include, for example, the processing system 506 of FIG. 5. The exemplary means 1000 may include means for generating, based on the first FTM measurement frame, a first ACK frame including one or more first fields and including at least one TRN field 1012. Means 1012 may include, for example, controller 230, controllers 280, digital signal processor 720, and/or processor 704 shown in FIG. 2 and FIG. 7. Means 1012 may include, for example, the processing system 506 of FIG. 5. The exemplary means 1000 may include means for outputting the first ACK frame for transmission to the second apparatus using the second set of antenna settings for the one or more first fields of the first ACK frame and using the first set of antenna settings for the at least one TRN field of the first ACK frame 1014. Means 1014 may include, for example, an interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 716, transmitter 710, digital signal processor 720, and/or processor 704 shown in FIG. 2 and FIG. 7. Means 1014 may include, for example, the first interface 508a of FIG. 5. The exemplary means 1000 may include means for storing a time of departure $t_3$ associated with the first ACK frame 1016. Means 1016 may include, for example, controller 230, controllers 280, digital signal processor 720, and/or processor 704 shown in FIG. 2 and FIG. 7. Means 1016 may include, for example, the processing system 506 of FIG. 5. The exemplary means 1000 may include means for obtaining, from the second apparatus, a second FTM measurement frame 1018. Means 1018 may include, for example, an interface (e.g., of a processor), antennas 224, antennas 252, receiver units 222, receiver units 254, RX spatial processor 240, RX spatial processors 260, RX data processor 242, RX data processors 270, controller 230, controllers 280, antennas 716, receiver 712, digital signal processor 720, and/or processor 704 shown in FIG. 2 and FIG. 7. Means 1018 may include, for example, the second interface 508b of FIG. 5. The exemplary means 1000 may include means for determining a position of the apparatus 1020. Means 1020 may include, for example, controller 230, controllers 280, digital signal processor 720, and/or processor 704 shown in FIG. 2 and FIG. 7. Means 1020 may include, for example, the processing system 506 of FIG. 5. The exemplary means 1000 may include means for transmitting the first request frame, which may include, for example, antennas 224, antennas 252, transmitter units 222, transmitter units 254, TX spatial processor 220, TX spatial processors 290, TX data processor 210, TX data processors 288, controller 230, controllers 280, antennas 716, transmitter 710, digital signal processor 720, and/or processor 704 shown in FIG. 2 and FIG. 7. The exemplary means 1000 may include means for receiving the first measurement frame via the first set of antenna settings for the at least one first field of the first measurement frame and via the second set of antenna settings for the one or more second fields of the first measurement frame, which may include, for example, antennas 224, antennas 252, receiver units 222, receiver units 254, RX spatial processor 240, RX spatial processors 260, RX data processor 242, RX data processors 270, controller 230, controllers 280, antennas 716, receiver 712, digital signal processor 720, and/or processor 704 shown in FIG. 2 and FIG. 7.

Figure 11:
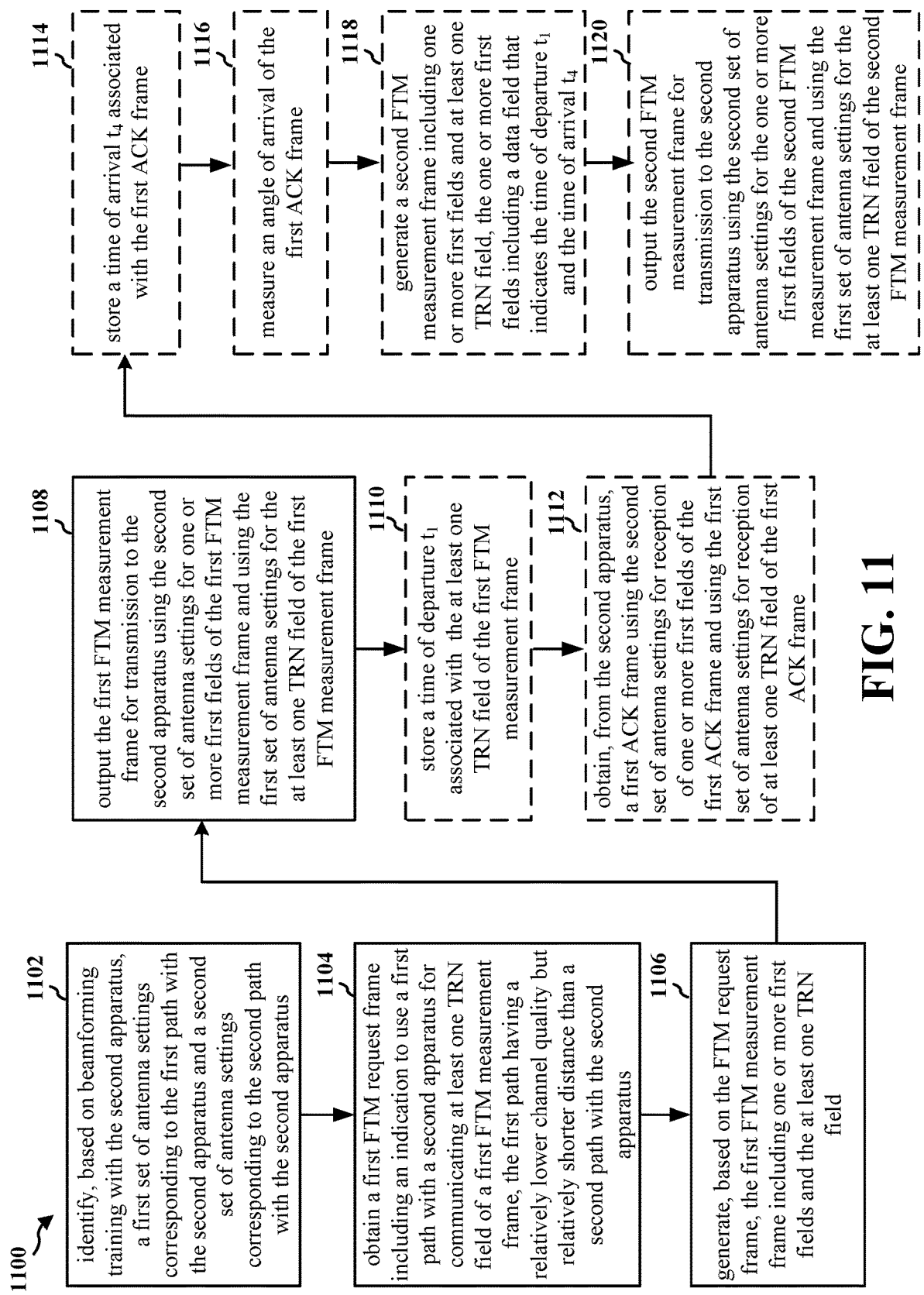
FIG. 11 is a flowchart of an example method of responding in an FTM session, in accordance with certain aspects of the present disclosure.

FIG. 11 is a flowchart of an example method 1100 of responding in an FTM session according to an FTM protocol, for example, in order to facilitate determination of a position by a second apparatus. The method 1100 may be performed using an apparatus (e.g., an AP 110, a UT 120, the responder 404, the responder 504, the wireless device 802, and/or the responder component 824). Although the method 1100 is described below with respect to the elements of the responder 404 and/or the responder 504, other components may be used to implement one or more of the operations described herein. Blocks denoted by dotted lines may represent optional operations.

At block 1102, the apparatus may identify, based on beamforming training with the second apparatus, a first set of antenna settings corresponding to the first path with the second apparatus and a second set of antenna settings corresponding to the second path with the second apparatus.

For example, referring to FIG. 5, the processing system 516 of the responder 504 may identify the responder first antenna setting 520a and the responder second antenna setting 520b based on beamforming training with the initiator 502. In an aspect, the responder first antenna setting 520a may correspond to the first path 522 with the initiator 502 having a relatively lower channel quality but relatively shorter distance than the second path 524 with the initiator 502 corresponding to the responder second antenna setting 520b.

At block 1104, the apparatus may obtain a first FTM request frame including an indication to use a first path with a second apparatus for communicating at least one TRN field of a first FTM measurement frame, the first path having a relatively lower channel quality but relatively shorter distance than a second path with the second apparatus. For example, referring to FIG. 4, the responder 404 may receive the FTM request frame 430, including a trigger field having a value set to indicate to use a first path for at least one TRN field of an FTM measurement frame. For example, referring to FIG. 5, the first interface 518a of the responder 504 may obtain the FTM request frame 540b that indicates the first path 522 is to be used for at least one TRN field of one or more frames of the measurement portion 540c of the FTM session.

At block 1106, the apparatus may generate, based on the first FTM request frame, the first FTM measurement frame including one or more first fields and the at least one TRN field. In an aspect, the one or more fields of the first FTM measurement frame comprise at least one of an STF, a CEF, a header field, and/or a data field. In an aspect, the header field may include one or more bits indicating use of the first path instead of the second path, e.g., for the at least one TRN field of the first FTM measurement frame. For example, referring to FIG. 4, the responder 404 may generate, based on the first FTM request frame 430, the second FTM measurement frame 434. For example, referring to FIGS. 5 and 6, the processing system 516 of the responder 504 may generate, based on the first FTM request frame 540b, a second FTM measurement frame of the measurement portion 540c. In an aspect, the second FTM measurement frame may include the first portion 610 (e.g., STF, CEF, header field, and/or data field) and the second portion 612 (e.g., at least one TRN field).

At block 1108, the apparatus may output the first FTM measurement frame for transmission to the second apparatus using the second set of antenna settings for one or more first fields of the first FTM measurement frame and using the first set of antenna settings for the at least one TRN field of the first FTM measurement frame. For example, referring to FIG. 4, the responder 404 may output the second FTM measurement frame 434 for transmission to the initiator 402 using a second set of antenna settings corresponding to a "best" path for one or more fields of the second FTM measurement frame 434 and using a first set of antenna settings corresponding to a first path (e.g., direct path, LoS path) for at least one TRN field of the second FTM measurement frame 434. For example, referring to FIGS. 5 and 6, the second interface 518b of the responder 504 may output the second FTM measurement frame of the measurement portion 540c for transmission to the initiator 502 using the responder second antenna setting 520b for the first portion 610 and using the responder first antenna setting 520a for the second portion 612.

At block 1110, the apparatus may store a time of departure $t_1$ associated with the at least one TRN field of the first FTM measurement frame. For example, referring to FIG. 4, the responder 404 may store a ToD $t_1$ associated with the at least one TRN field of the second FTM measurement frame 434. For example, referring to FIGS. 5 and 6, the processing system 516 of the responder 504 may store a ToD $t_1$ associated with transmission of the second portion 612 (e.g., at least one field) of the second FTM measurement frame of the measurement portion 540c.

At block 1112, the apparatus may obtain, from the second apparatus, a first ACK frame using the second set of antenna settings for reception of one or more first fields of the first ACK frame and using the first set of antenna settings for reception of at least one TRN field of the first ACK frame. For example, referring to FIG. 4, the responder 404 may obtain, from the initiator 402, the first ACK frame 436 using the second set of antenna settings corresponding to a "best" path for reception of one or more first fields of the first ACK frame 436 and using a first set of antenna settings corresponding to a first path for reception of at least one TRN field of the first ACK frame 436. For example, referring to FIGS. 5 and 6, the first interface 518a of the responder 504 may obtain, from the initiator 502, a first ACK frame of the measurement portion 540c using the responder second antenna setting 520b for reception of the first portion 614 of the first ACK frame and using the responder first antenna setting 520a for reception of the second portion 616 of the first ACK frame.

At block 1114, the apparatus may store a time of arrival $t_4$ associated with the first ACK frame. For example, referring to FIG. 4, the responder 404 may store a ToA $t_4$ of the first ACK frame 436. For example, referring to FIGS. 5 and 6, the processing system 516 of the responder 504 may store a ToA $t_4$ of the first ACK frame of the measurement portion 540c. In an aspect, the processing system 516 of the responder 504 may store the ToA $t_4$ of the first ACK frame based on the first portion 614 of the first ACK frame or based on the second portion 616 of the first ACK frame.

At block 1116, the apparatus may measure an angle of arrival of the first ACK frame. For example, referring to FIG. 4, the responder 404 may measure an AoA of the first ACK frame 436. For example, referring to FIGS. 5 and 6, the processing system 516 of the responder 504 may measure an angle of arrival of the first portion 614 and/or the second portion 616 of the first ACK frame of the measurement portion 540c.

At block 1118, the apparatus may generate a second FTM measurement frame including one or more first fields and at least one TRN field, the one or more first fields including a data field that indicates the time of departure $t_1$ and the time of arrival $t_4$. In an aspect, the apparatus may include, in the data field of the second FTM measurement frame, the measured angle of arrival. For example, referring to FIG. 4, the responder 404 may generate the third FTM measurement frame 438, which may include the ToD $t_1$ and the ToA $t_4$. For example, referring to FIG. 5, the processing system 516 of the responder 504 may generate a third measurement frame of the measurement portion 540c, which may include the ToD $t_1$ and the ToA $t_4$.

At block 1120, the apparatus may output the second FTM measurement frame for transmission to the second apparatus using the second set of antenna settings for the one or more first fields of the second FTM measurement frame and using the first set of antenna settings for the at least one TRN field of the second FTM measurement frame. For example, referring to FIG. 4, the responder 404 may output the third FTM measurement frame 438 for transmission to the initiator 402 using a second set of antenna settings corresponding to a "best" path for one or more fields of the third FTM measurement frame 438 and using a first set of antenna settings corresponding to a first path (e.g., direct path, LoS path) for at least one TRN field of the third FTM measurement frame 438. For example, referring to FIG. 5, the second interface 518b of the responder 504 may output the third FTM measurement frame of the measurement portion 540c for transmission to the initiator 502 using the responder second antenna setting 520b for one or more first fields (e.g., STF, CEF, header field, and/or data field) of the third FTM measurement frame and using the responder first antenna setting 520a for at least one TRN field of the third FTM measurement frame.

Figure 12:
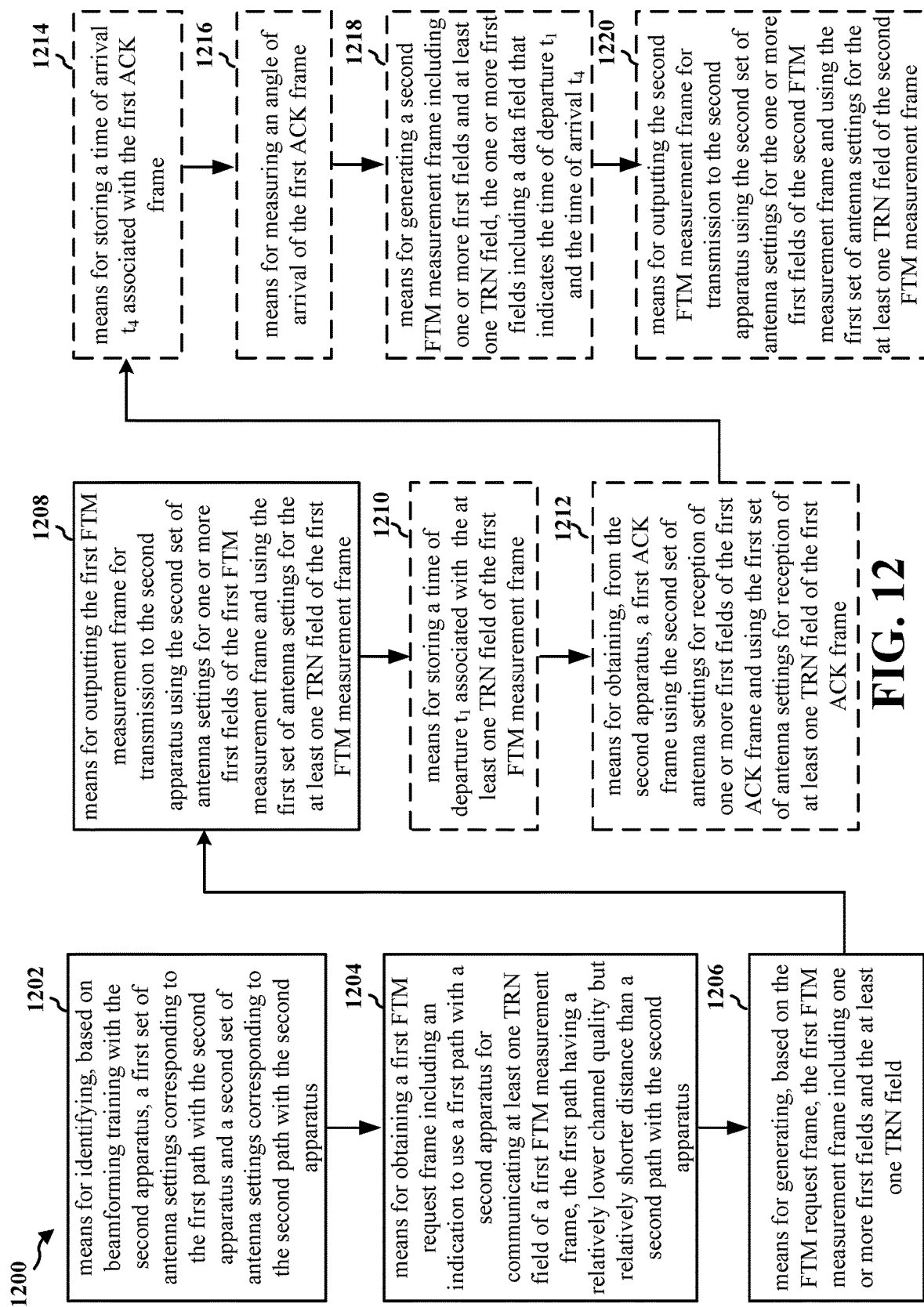
FIG. 12 illustrates exemplary means capable of performing the operations set forth in FIG. 11, in accordance with certain aspects of the present disclosure.

FIG. 12 illustrates exemplary means 1200 capable of performing the operations set forth in FIG. 11. The exemplary means 1200 may include means for identifying, based on beamforming training with the second apparatus, a first set of antenna settings corresponding to the first path with the second apparatus and a second set of antenna settings corresponding to the second path with the second apparatus 1202. Means 1202 may include, for example, controller 230, controllers 280, digital signal processor 820, and/or processor 804 shown in FIG. 2 and FIG. 8. Means 1202 may include, for example, the processing system 516 of FIG. 5. The exemplary means 1200 may include means for obtaining a first FTM request frame including an indication to use a first path with a second apparatus for communicating at least one TRN field of a first FTM measurement frame 1204, the first path having a relatively lower channel quality but relatively shorter distance than a second path with the second apparatus. Means 1204 may include, for example, an interface (e.g., of a processor), antennas 224, antennas 252, receiver units 222, receiver units 254, RX spatial processor 240, RX spatial processors 260, RX data processor 242, RX data processors 270, controller 230, controllers 280, antennas 816, receiver 812, digital signal processor 820, and/or processor 804 shown in FIG. 2 and FIG. 8. Means 1204 may include, for example, the first interface 518a of FIG. 5. The exemplary means 1200 may include means for generating, based on the first FTM request frame, the first FTM measurement frame including one or more first fields and the at least one TRN field 1206. Means 1206 may include, for example, controller 230, controllers 280, digital signal processor 820, and/or processor 804 shown in FIG. 2 and FIG. 8. Means 1206 may include, for example, the processing system 516 of FIG. 5. The exemplary means 1200 may include means for outputting the first FTM measurement frame for transmission to the second apparatus using the second set of antenna settings for one or more first fields of the first FTM measurement frame and using the first set of antenna settings for the at least one TRN field of the first FTM measurement frame 1208. Means 1208 may include, for example, an interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 816, transmitter 810, digital signal processor 820, and/or processor 804 shown in FIG. 2 and FIG. 8. Means 1208 may include, for example, the second interface 518b of FIG. 5. The exemplary means 1200 may include means for storing a time of departure $t_1$ associated with the at least one TRN field of the first FTM measurement frame 1210. Means 1210 may include, for example, controller 230, controllers 280, digital signal processor 820, and/or processor 804 shown in FIG. 2 and FIG. 8. Means 1210 may include, for example, the processing system 516 of FIG. 5. The exemplary means 1200 may include means for obtaining, from the second apparatus, a first ACK frame using the second set of antenna settings for reception of one or more first fields of the first ACK frame and using the first set of antenna settings for reception of at least one TRN field of the first ACK frame 1212. Means 1212 may include, for example, an interface (e.g., of a processor), antennas 224, antennas 252, receiver units 222, receiver units 254, RX spatial processor 240, RX spatial processors 260, RX data processor 242, RX data processors 270, controller 230, controllers 280, antennas 816, receiver 812, digital signal processor 820, and/or processor 804 shown in FIG. 2 and FIG. 8. Means 1212 may include, for example, the first interface 518a of FIG. 5. The exemplary means 1200 may include means for storing a time of arrival $t_4$ associated with the first ACK frame 1214. Means 1214 may include, for example, controller 230, controllers 280, digital signal processor 820, and/or processor 804 shown in FIG. 2 and FIG. 8. Means 1214 may include, for example, the processing system 516 of FIG. 5. The exemplary means 1200 may include means for measuring an angle of arrival of the first ACK frame 1216. Means 1216 may include, for example, controller 230, controllers 280, digital signal processor 820, and/or processor 804 shown in FIG. 2 and FIG. 8. Means 1216 may include, for example, the processing system 516 of FIG. 5. The exemplary means 1200 may include means for generating a second FTM measurement frame including one or more first fields and at least one TRN field, the one or more first fields including a data field that indicates the time of departure $t_1$ and the time of arrival $t_4$ 1218. Means 1218 may include, for example, controller 230, controllers 280, digital signal processor 820, and/or processor 804 shown in FIG. 2 and FIG. 8. Means 1218 may include, for example, the processing system 516 of FIG. 5. The exemplary means 1200 may include means for outputting the second FTM measurement frame for transmission to the second apparatus using the second set of antenna settings for the one or more first fields of the second FTM measurement frame and using the first set of antenna settings for the at least one TRN field of the second FTM measurement frame 1220. Means 1220 may include, for example, an interface (e.g., of a processor), antennas 224, antennas 252, transmitter units 222, transmitter units 254, TX spatial processor 220, TX spatial processors 290, TX data processor 210, TX data processors 288, controller 230, controllers 280, antennas 816, transmitter 810, digital signal processor 820, and/or processor 804 shown in FIG. 2 and FIG. 8. Means 1220 may include, for example, the second interface 518b of FIG. 5. The exemplary means 1200 may further include means for receiving the first request frame, which may include, for example, antennas 224, antennas 252, receiver units 222, receiver units 254, RX spatial processor 240, RX spatial processors 260, RX data processor 242, RX data processors 270, controller 230, controllers 280, antennas 816, receiver 812, digital signal processor 820, and/or processor 804 shown in FIG. 2 and FIG. 8. The exemplary means 1200 may further include means for transmitting the first measurement frame via the first set of antenna setting for the at least one first field of the first measurement frame and via the second set of antenna settings for the one or more second fields of the first measurement frame, which may include, for example, antennas 224, antennas 252, transmitter units 222, transmitter units 254, TX spatial processor 220, TX spatial processors 290, TX data processor 210, TX data processors 288, controller 230, controllers 280, antennas 816, transmitter 810, digital signal processor 820, and/or processor 804 shown in FIG. 2 and FIG. 8.

The various operations of methods described above may be performed by any suitable means capable of performing the operations. The means may include various hardware and/or software component(s) and/or module(s), including, but not limited to a circuit, an application specific integrated circuit (ASIC), or processor. Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) for receiving structures processed by an RF front end (e.g., via a bus). Similarly, the term transmitter may refer to an RF transmitter of an RF front end or an interface (e.g., of a processor) for outputting structures to an RF front end for transmission (e.g., via a bus).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more operations or actions for achieving the described method. The method operations and/or actions may be interchanged with one another without departing from the scope of the claims. In other words, unless a specific order of operations or actions is specified, the order and/or use of specific operations and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, the apparatus comprising:
   a processing system configured to:
      identify a first set of antenna settings and a second set of antenna settings based on beamforming training with a second apparatus, the first set of antenna settings corresponding to a first path with the second apparatus that is different from a second path with the second apparatus corresponding to the second set of antenna settings, and
      generate a first request frame including an indication to use the first path for at least one first field of a first measurement frame;
   a first interface configured to output the first request frame for transmission to the second apparatus; and
   a second interface configured to obtain, from the second apparatus, the first measurement frame via the first set of antenna settings for reception of at least one first field in a first portion of the first measurement frame transmitted over the first path and via the second set of antenna settings for reception of one or more second fields in a second portion of the first measurement frame transmitted over the second path,
   wherein the one or more second fields of the first measurement frame include information indicating at least one timing measurement.

2. The apparatus of claim 1, wherein the first request frame comprises a trigger field, and the indication to use the first path comprises a value of the trigger field.

3. The apparatus of claim 1, wherein:
   the processing system is further configured to generate, based on the first measurement frame, a first acknowledgement (ACK) frame including at least one first field and including one or more second fields, and
   the first interface is further configured to output the first ACK frame for transmission to the second apparatus via the first set of antenna settings for the at least one first field of the first ACK frame and via the second set of antenna settings for the one or more second fields of the first ACK frame.

4. The apparatus of claim 3, wherein the one or more second fields of the first ACK frame comprise at least one of a short training field (STF), a channel estimation field (CEF), a header field, or a data field.

5. The apparatus of claim 4, wherein the header field includes one or more bits indicating use of the first path for the at least one first field of the first ACK frame.

6. The apparatus of claim 3, wherein:
   the second interface is further configured to obtain, from the second apparatus, a second measurement frame via the first set of antenna settings for reception of at least one first field of the second measurement frame and via the second set of antenna settings for reception of one or more second fields of the second measurement frame, the one or more second fields of the second measurement frame including a data field indicating a time of departure $t_1$ associated with the first measurement frame and a time of arrival $t_4$ associated with the first ACK frame, and
   the processing system is further configured to determine a position of the apparatus based on the time of departure $t_1$ and the time of arrival $t_4$, and at least one of output the position of the apparatus to an application layer of the apparatus or output a message that indicates the position of the apparatus for transmission to a server.

7. The apparatus of claim 6, wherein the processing system is further configured to:
   store a time of arrival $t_2$ associated with the at least one first field of the first measurement frame,
   store a time of departure $t_3$ associated with the first ACK frame, and
   determine the position of the apparatus further based on the time of arrival $t_2$ and the time of departure $t_3$.

8. The apparatus of claim 6, wherein the one or more second fields of the second measurement frame include a data field that indicates an angle of arrival associated with the first ACK frame, and the processing system is further configured to determine the position of the apparatus further based on the angle of arrival.

9. The apparatus of claim 1, wherein the at least one first field comprises a training (TRN) field, and wherein the first request frame and the first measurement frame are associated with a fine timing measurement (FTM) session.

10. An apparatus for wireless communication, the apparatus comprising:
    a first interface configured to obtain a first request frame including an indication to use a first path with a second apparatus for communicating at least one first field of a first measurement frame, the first path with the second apparatus different from a second path with the second apparatus;
    a processing system configured to:
       identify, based on beamforming training with the second apparatus, a first set of antenna settings corresponding to the first path with the second apparatus and a second set of antenna settings corresponding to the second path with the second apparatus, and
       generate, based on the first request frame, the first measurement frame including the at least one first field in a first portion of the first measurement frame and including one or more second fields in a second portion of the first measurement frame, wherein the one or more second fields of the first measurement frame include information indicating at least one timing measurement; and a second interface configured to output the first measurement frame for transmission to the second apparatus via the first set of antenna settings for transmitting the first portion including the at least one first field of the first measurement frame over the first path and via the second set of antenna settings for transmitting the second portion including the one or more second fields of the first measurement frame over the second path.

11. The apparatus of claim 10, wherein:
the first request frame comprises a trigger field,
the indication to use the first path comprises a value of the trigger field, and
the output of the first measurement frame for transmission to the second apparatus via the first set of antenna settings for the at least one first field of the first measurement frame and via the second set of antenna settings for the one or more second fields of the first measurement frame is based on the value of the trigger field.

12. The apparatus of claim 10, wherein the one or more second fields of the first measurement frame comprise at least one of a short training field (STF), a channel estimation field (CEF), a header field, or a data field.

13. The apparatus of claim 12, wherein the header field includes one or more bits indicating use of the first path for the at least one first field of the first measurement frame.

14. The apparatus of claim 10, wherein:
the first interface is further configured to obtain, from the second apparatus, a first acknowledgement (ACK) frame via the first set of antenna settings for reception of at least one first field of the first ACK frame and via the second set of antenna settings for reception of one or more second fields of the first ACK frame;
the processing system is further configured to:
store a time of departure $t_1$ associated with the at least one first field of the first measurement frame,
store a time of arrival $t_4$ associated with the first ACK frame, and
generate a second measurement frame including at least one first field and including one or more second fields, the one or more second fields including a data field that indicates the time of departure $t_1$ and the time of arrival $t_4$; and
the second interface is further configured to output the second measurement frame for transmission to the second apparatus via the first set of antenna settings for the at least one first field of the second measurement frame and via the second set of antenna settings for the one or more second fields of the second measurement frame.

15. The apparatus of claim 14, wherein the processing system is further configured to measure an angle of arrival of the first ACK frame, and wherein the generation of the second measurement frame comprises including the measured angle of arrival in the data field of the second measurement frame.

16. The apparatus of claim 10, wherein the at least one first field comprises a training (TRN) field, and wherein the first request frame and the first measurement frame are associated with a fine timing measurement (FTM) session.

17. The apparatus of claim 10, further comprising:
a receiver configured to receive the first request frame; and
a transmitter configured to transmit the first measurement frame to the second apparatus via the first set of antenna settings for the at least one first field of the first measurement frame and via the second set of antenna settings for one or more second fields of the first measurement frame,
wherein the apparatus is configured as a wireless node.

18. A wireless node for wireless communication, comprising:
a processing system configured to:
identify a first set of antenna settings and a second set of antenna settings based on beamforming training with a second apparatus, the first set of antenna settings corresponding to a first path with the second apparatus that is different from a second path with the second apparatus corresponding to the second set of antenna settings, and
generate a first request frame including an indication to use the first path for at least one first field of a first measurement frame;
a transmitter configured to transmit the first request frame to the second apparatus; and
a receiver configured to receive, from the second apparatus, the first measurement frame via the first set of antenna settings for the at least one first field in a first portion of the first measurement frame transmitted over the first path and via the second set of antenna settings for one or more second fields in a second portion of the first measurement frame transmitted over the second path,
wherein the one or more second fields of the first measurement frame include information indicating at least one timing measurement.

* * * * *